(12) United States Patent
Hanada et al.

(10) Patent No.: US 9,412,479 B2
(45) Date of Patent: Aug. 9, 2016

(54) METHOD AND COMPOSITION FOR REMOVING RADIOACTIVE CESIUM

(71) Applicants: Dainichiseika Color & Chemicals Mfg. Co., Ltd., Tokyo (JP); Ukima Chemicals & Color Mfg. Co., Ltd., Tokyo (JP)

(72) Inventors: Kazuyuki Hanada, Tokyo (JP); Kazuya Kimura, Tokyo (JP); Kazuaki Muto, Tokyo (JP); Kenichi Takahashi, Tokyo (JP); Manabu Uruno, Tokyo (JP)

(73) Assignees: Dainichiseika Color & Chemicals Mfg. Co., Ltd., Chuo-Ku (JP); Ukima Chemicals & Color Mfg. Co., Ltd., Chuo-Ku (JP)

( * ) Notice: Subject to any disclaimer, the term of this patent is extended or adjusted under 35 U.S.C. 154(b) by 0 days.

(21) Appl. No.: 14/795,986

(22) Filed: Jul. 10, 2015

(65) Prior Publication Data

US 2015/0318064 A1 Nov. 5, 2015

Related U.S. Application Data

(63) Continuation of application No. PCT/JP2014/053822, filed on Feb. 18, 2014.

(30) Foreign Application Priority Data

| Feb. 19, 2013 | (JP) | 2013-030265 |
| Feb. 27, 2013 | (JP) | 2013-037343 |
| Mar. 21, 2013 | (JP) | 2013-058844 |
| Apr. 12, 2013 | (JP) | 2013-084337 |

(51) Int. Cl.
| *G21F 9/16* | (2006.01) |
| *G21F 9/30* | (2006.01) |
| *B01J 20/26* | (2006.01) |
| *G21F 9/12* | (2006.01) |
| *G21F 9/28* | (2006.01) |
| *C08G 18/50* | (2006.01) |
| *C08G 18/61* | (2006.01) |
| *C08G 18/66* | (2006.01) |
| *C08G 18/76* | (2006.01) |
| *C08L 75/04* | (2006.01) |
| *C08K 3/34* | (2006.01) |

(52) U.S. Cl.
CPC ............... *G21F 9/167* (2013.01); *B01J 20/26* (2013.01); *C08G 18/5024* (2013.01); *C08G 18/61* (2013.01); *C08G 18/667* (2013.01); *C08G 18/6637* (2013.01); *C08K 3/346* (2013.01); *C08L 75/04* (2013.01); *G21F 9/12* (2013.01); *G21F 9/162* (2013.01); *G21F 9/28* (2013.01); *G21F 9/30* (2013.01); *G21F 9/307* (2013.01)

(58) Field of Classification Search
CPC ................ G21F 9/00; G21F 9/16; B09B 3/00
USPC ..................................... 588/6, 255
See application file for complete search history.

(56) References Cited

U.S. PATENT DOCUMENTS

| 4,092,275 A | 5/1978 | Reischl et al. |
| 4,184,990 A | 1/1980 | Reischl et al. |
| 2004/0127978 A1 | 7/2004 | Sparer et al. |

FOREIGN PATENT DOCUMENTS

| EP | 0 475 635 A1 | 3/1992 |
| JP | 52-060847 A1 | 5/1977 |
| JP | 62-044239 B2 | 9/1987 |
| JP | 04-118596 A1 | 4/1992 |
| JP | 05-146674 A1 | 6/1993 |
| JP | 2002-128859 A1 | 5/2002 |
| JP | 2003-135577 A1 | 5/2003 |
| JP | 2004-041873 A1 | 2/2004 |
| JP | 2004-050171 A1 | 2/2004 |
| JP | 2004-136158 A1 | 5/2004 |
| JP | 2005-037133 A1 | 2/2005 |
| JP | 2006-502136 A1 | 1/2006 |
| JP | 2008-116280 A1 | 5/2008 |
| JP | 2013-002865 A1 | 1/2013 |
| JP | 2013-148405 A1 | 8/2013 |
| JP | 2013-190237 A1 | 9/2013 |

(Continued)

OTHER PUBLICATIONS

International Search Report (Application No. PCT/JP2014/053822) dated Apr. 28, 2014.

(Continued)

*Primary Examiner* — Edward Johnson
(74) *Attorney, Agent, or Firm* — Burr & Brown, PLLC

(57) ABSTRACT

The present invention intends to provide a method for removing radioactive cesium, or radioactive iodine and radioactive cesium that is simple and low-cost, further does not require an energy source such as electricity, moreover can take in and stably immobilize the removed radioactive substances within a solid, and can reduce the volume of radioactive waste as necessary, and to provide a hydrophilic resin composition using for the method for removing radioactive cesium, or radioactive iodine and radioactive cesium, and the object of the present invention is achieved by using a hydrophilic resin composition containing: at least one hydrophilic resin selected from the group consisting of a hydrophilic polyurethane resin, a hydrophilic polyurea resin, and a hydrophilic polyurethane-polyurea resin each having at least a hydrophilic segment; and a clay mineral dispersed therein in a ratio of at least 1 to 180 mass parts relative to 100 mass parts of the hydrophilic resin.

23 Claims, 3 Drawing Sheets

(56) References Cited

FOREIGN PATENT DOCUMENTS

| JP | 20 3-217760 | A1 | 10/2013 |
| JP | 2013-200206 | A1 | 10/2013 |
| JP | 2013-212487 | A1 | 10/2013 |

OTHER PUBLICATIONS

Japanese Office Action (Application No. 2013-030265) dated Nov. 5, 2015.

METHOD AND COMPOSITION FOR REMOVING RADIOACTIVE CESIUM

TECHNICAL FIELD

The present invention relates to a removal method capable of applying removal processing to radioactive cesium in a radioactive waste liquid and/or a radioactive solid matter generated from a nuclear power plant or a reprocessing facility of spent nuclear fuel, and to a hydrophilic resin composition suitable for the method, the hydrophilic resin composition exhibiting a function of immobilizing radioactive cesium. The present invention also relates to a removal method capable of applying removal processing to both of radioactive iodine and radioactive cesium present in a radioactive waste liquid and/or a radioactive solid matter generated from a nuclear power plant or a reprocessing facility of spent nuclear fuel, and to a hydrophilic resin composition exhibiting a function of immobilizing both of the radioactive iodine and the radioactive cesium.

BACKGROUND ART

In currently widespread nuclear reactor power plants, nuclear fission in a nuclear reactor is accompanied by generation of a considerable amount of radioactive by-products. The main radioactive substances among the radioactive by-products are fission products and active elements including extremely dangerous radioactive isotopes such as radioactive iodine, radioactive cesium, radioactive strontium, and radioactive cerium. Since radioactive iodine among these radioactive substances turns into a gas at 184° C., there is a risk that the radioactive iodine is extremely liable to be discharged at the time of inspection or exchange of nuclear fuel and furthermore by an unforeseen event such as an accident during handling nuclear fuel or a reactor excursion accident. The major radioactive iodine isotopes to be taken into account at the time of discharge are iodine 129 having a long half-life (half-life: $1.57 \times 10^7$ years) and iodine 131 having a short half-life (half-life: 8.05 days). Here, ordinary iodine that does not exhibit radioactivity is an essential trace element in the human body, is collected in the thyroid gland near the throat, and becomes a component of a growth hormone. Therefore, when a human takes in radioactive iodine through breathing or water/foods, the radioactive iodine is collected in the thyroid gland in the same way as in the case of ordinary iodine and increases internal exposure to radioactivity, and accordingly, a particularly strict measure for reducing the amount of radioactivity to be discharged must be implemented with regard to radioactive iodine.

Moreover, radioactive cesium has a melting point of 28.4° C., is one of metals that become liquid at around a normal temperature, and is a metal that is extremely liable to be discharged as well as radioactive iodine. The major radioactive cesium isotopes to be taken into account at the time of discharge are cesium 134 having a relatively short half-life (half-life: 2 years) and cesium 137 having a long half-life (half-life: 30 years). Among the major radioactive cesium isotopes, cesium 137 in particular not only has a long half-life but also emits high-energy radiation, and has a property that water solubility is high because the radioactive cesium is an alkaline metal. Furthermore, radioactive cesium is easily absorbed in the human body through breathing and also through skin and is uniformly dispersed in the whole body, and therefore a health hazard to humans when the radioactive cesium is discharged becomes serious.

Thus, when radioactive cesium is accidentally discharged due to an unforeseen event or the like from nuclear reactors in operation all over the world, there are concerns that the radioactive cesium causes not only radioactive contamination to workers at nuclear reactors or neighborhood residents but also radioactive contamination over a wider range to humans and animals through foods or water contaminated by the radioactive cesium carried by air. The danger with regard to the radioactive contamination has already been proven undoubtedly by the accident in Chernobyl nuclear power plant.

To such a situation, a cleaning processing system, a physical/chemical processing system by solid adsorbent filling using fibrous activated carbon or the like (see Patent Literatures 1 and 2), processing by an ion exchange material (see Patent Literature 3), and so on have been studied as a method for processing radioactive iodine generated in a nuclear reactor.

However, any of the above methods has problems as will be described below, and the development of a method for removing radioactive iodine in which these problems are solved is desired. First of all, an alkaline cleaning method or the like exists as a cleaning processing system that is practically used, however there are lots of problems in terms of quantity and safety to apply processing by the cleaning processing system with a liquid adsorbent and store the processed liquid as it is for a long period of time. Moreover, in the physical/chemical processing system by solid adsorbent filling, captured radioactive iodine is always facing the possibility of being replaced with other gases, and moreover the processing system has a problem that an adsorbed matter is liable to be discharged when the temperature increases. Furthermore, in the processing system by an ion exchange material, the heat resistant temperature of the ion exchange material is up to about 100° C. and there is a problem that the ion exchange material cannot exhibit sufficient performance at a temperature higher than the heat resistant temperature.

On the other hand, as a method for removal processing of radioactive cesium generated by nuclear fission in a nuclear reactor, an adsorption method with an inorganic ion exchanger or a selective ion exchange resin, a coprecipitation method by using a heavy metal and a soluble ferrocyanide or ferrocyanide salt together, a chemical processing method with a cesium precipitation reagent, and so on are known (see, for example, Patent Literature 4).

However, in any of the above-described processing methods, large scale facilities such as a circulation pump, a cleaning tank, and furthermore a filling tank containing various adsorbents are necessary, and in addition, a large amount of energy to operate these facilities is needed. Moreover, when supply of the power source is suspended as in the accident occurred at the Fukushima No. 1 nuclear power plant in Japan on Mar. 11, 2011, these facilities cannot be operated and, in such a case, the degree of contamination risk by radioactive cesium increases. And particularly in the case where the supply of the power source is suspended, applying a method for removing radioactive cesium diffused into peripheral areas by a reactor excursion accident falls into an extremely difficult situation, and it is concerned that a situation in which radioactive contamination expands may occur. Accordingly, there is an urgent need to develop a technology for removing radioactive cesium that is applicable even when the situation in which the supply of the power source is suspended occurs, and when such a technology for removing radioactive cesium is developed, the method is extremely useful.

CITATION LIST

Patent Literature

Patent Literature 1: Japanese Patent Publication No. 62-44239
Patent Literature 2: Japanese Patent Laid-Open No. 2008-116280
Patent Literature 3: Japanese Patent Laid-Open No. 2005-37133
Patent Literature 4: Japanese Patent Laid-Open No. 4-118596

SUMMARY OF INVENTION

Technical Problem

Accordingly, an object of the first present invention and the second present invention is to solve the problems of conventional technologies and to provide a novel method for removing radioactive cesium that is simple and low-cost, furthermore does not require an energy source such as electricity, moreover can take in and stably immobilize the removed radioactive cesium within a solid, and is capable of reducing the volume of radioactive waste as necessary. Moreover, another object of the first present invention and the second present invention is to provide a novel hydrophilic resin composition that has a function useful for the above-described technology and capable of immobilizing radioactive cesium, the hydrophilic resin composition capable of realizing applying removal processing to radioactive cesium simply.

Furthermore, yet another object of the second present invention is to provide a novel hydrophilic resin composition for removing radioactive cesium excellent in practical use by which hydrophilic resin composition the water resistance and the blocking resistance performance (sticking resistance) of the surface are improved in the case where the hydrophilic resin composition is used in a form such as a resin film or sheet in applying the removal processing in addition to having a function particularly useful for the above-described method and capable of immobilizing radioactive cesium.

Moreover, an object of the third present invention and the fourth present invention is, in providing an effective removal method capable of applying removal processing to radioactive iodine and radioactive cesium together, to solve the problems of conventional technologies and to provide a novel method for removing radioactive iodine and radioactive cesium that is simple and low-cost, furthermore does not require an energy source such as electricity, moreover can take in and stably immobilize the removed radioactive iodine and radioactive cesium within a solid, and is capable of reducing the volume of radioactive waste as necessary. Moreover, another object of the third present invention and the fourth present invention is to provide a novel hydrophilic resin composition that has a function useful in carrying out the above-described technology and capable of immobilizing both of radioactive iodine and radioactive cesium, the hydrophilic resin composition capable of applying removal processing to these radioactive substances together.

Furthermore, yet another object of the fourth present invention is to provide a novel hydrophilic resin composition that is more excellent in practical use by which hydrophilic resin composition the water resistance and the blocking resistance performance (sticking resistance) of the surface are improved in the case where the hydrophilic resin composition is used in a form such as a resin film or sheet in applying removal processing in addition to having a function particularly useful for the above-described method and capable of immobilizing radioactive iodine and radioactive cesium.

Solution to Problem

Each of the objects is achieved by the first, the second, the third, or the fourth present invention described below. That is to say, the first present invention provides a method for removing radioactive cesium applying removal processing to radioactive cesium in a radioactive waste liquid and/or a radioactive solid matter using a hydrophilic resin composition comprising a hydrophilic resin and a clay mineral, wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment; and the hydrophilic resin composition comprises the clay mineral dispersed therein in a ratio of at least 1 to 180 mass parts relative to 100 mass parts of the hydrophilic resin.

The second present invention provides a method for removing radioactive cesium applying removal processing to radioactive cesium present in a radioactive waste liquid and/or a radioactive solid matter using a hydrophilic resin composition comprising a hydrophilic resin and a clay mineral, wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a polysiloxane segment; and the hydrophilic resin composition comprises the clay mineral dispersed therein in a ratio of at least 1 to 180 mass parts relative to 100 mass parts of the hydrophilic resin.

In the above-described second present invention, it is preferable that the hydrophilic resin is a resin formed from, as a part of a raw material, a compound having at least one active hydrogen-containing group and a polysiloxane segment in the same molecule.

As another embodiment, the first present invention provides a hydrophilic resin composition for removing radioactive cesium having a function capable of immobilizing radioactive cesium in liquid and/or a solid matter, wherein the hydrophilic resin composition comprises a hydrophilic resin and a clay mineral; the hydrophilic resin is a hydrophilic resin having a hydrophilic segment, the resin being insoluble to water and hot water; and the clay mineral is dispersed in the hydrophilic resin composition in a ratio of at least 1 to 180 mass parts relative to 100 mass parts of the hydrophilic resin.

Moreover, as yet another embodiment, the first present invention provides a hydrophilic resin composition for removing radioactive cesium having a function capable of removing radioactive cesium in liquid and/or a solid matter, wherein the hydrophilic resin composition comprises a hydrophilic resin and a clay mineral; the hydrophilic resin is at least one selected from the group consisting of a hydrophilic polyurethane resin, a hydrophilic polyurea resin, and a hydrophilic polyurethane-polyurea resin each having a hydrophilic segment and each obtained by reacting an organic polyisocyanate with a high molecular weight hydrophilic polyol and/or polyamine being a hydrophilic component; and the clay mineral is dispersed in the hydrophilic resin composition in a ratio of at least 1 to 180 mass parts relative to 100 mass parts of the hydrophilic resin.

As another embodiment, the second present invention provides a hydrophilic resin composition for removing radioactive cesium exhibiting a function capable of immobilizing radioactive cesium in liquid and/or a solid matter, wherein the hydrophilic resin composition comprises a hydrophilic resin and a clay mineral; the hydrophilic resin is a resin having a hydrophilic segment and a polysiloxane segment and obtained by reacting, as a part of a raw material, a compound having at least one active hydrogen-containing group and a polysiloxane segment in the same molecule, the resin being insoluble to water and hot water; and the clay mineral is dispersed in the hydrophilic resin composition in a ratio of at least 1 to 180 mass parts relative to 100 mass parts of the hydrophilic resin.

Moreover, as yet another embodiment, the second present invention provides a hydrophilic resin composition for removing radioactive cesium exhibiting a function capable of immobilizing radioactive cesium in liquid and/or a solid matter, wherein the hydrophilic resin composition comprises a hydrophilic resin and a clay mineral; the hydrophilic resin is at least one selected from the group consisting of a hydrophilic polyurethane resin, a hydrophilic polyurea resin, and a hydrophilic polyurethane-polyurea resin each having a hydrophilic segment, further each having, in the main chain and/or a side chain in the structure thereof, a polysiloxane segment, and each obtained by reacting an organic polyisocyanate, a high molecular weight hydrophilic polyol and/or polyamine being a hydrophilic component, and a compound having at least one active hydrogen-containing group and a polysiloxane segment in the same molecule; and the clay mineral is dispersed in the hydrophilic resin composition in a ratio of at least 1 to 180 mass parts relative to 100 mass parts of the hydrophilic resin.

Preferable embodiments of the first or the second present invention relating to the above-described method for removing radioactive cesium or the above-described hydrophilic resin composition include: the hydrophilic segment is a polyethylene oxide segment; and the clay mineral is at least one selected from the group consisting of pyrophylite, Kaolinite, mica, smectite (montmorillonite), and vermiculite each having a layered structure.

As the third present invention, provided is a method for removing radioactive iodine and radioactive cesium applying removal processing to both of radioactive iodine and radioactive cesium in a radioactive waste liquid and/or a radioactive solid matter using a hydrophilic resin composition comprising a hydrophilic resin and a clay mineral, wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a tertiary amino group; and the hydrophilic resin composition comprises the clay mineral dispersed therein in a ratio of 1 to 180 mass parts relative to 100 mass parts of the hydrophilic resin.

A preferable embodiment of the above-described third present invention includes that the hydrophilic resin is a resin formed from, as a part of a raw material, a polyol having at least one tertiary amino group or a polyamine having at least one tertiary amino group.

As the fourth present invention, provided is a method for removing radioactive iodine and radioactive cesium capable of applying removal processing to both of radioactive iodine and radioactive cesium in a radioactive waste liquid and/or a radioactive solid matter using a hydrophilic resin composition, wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a tertiary amino group and a polysiloxane segment; and the hydrophilic resin composition comprises the clay mineral dispersed therein in a ratio of 1 to 180 mass parts relative to 100 mass parts of the hydrophilic resin.

A preferable embodiment of the above-described fourth present invention includes that the hydrophilic resin is a resin formed from, as a part of a raw material, a polyol having at least one tertiary amino group or a polyamine having at least one tertiary amino group, and a compound having at least one active hydrogen-containing group and a polysiloxane segment in the same molecule.

As another embodiment, the third present invention provides a hydrophilic resin composition for removing radioactive iodine and radioactive cesium exhibiting a function capable of immobilizing both of radioactive iodine and radioactive cesium present in liquid and/or a solid matter, wherein the hydrophilic resin composition comprises a hydrophilic resin and a clay mineral; the hydrophilic resin is a resin having a hydrophilic segment, having, in the molecular chain thereof, a tertiary amino group, and formed from, as a part of a raw material, a polyol having at least one tertiary amino group or a polyamine having at least one tertiary amino group, the resin being insoluble to water and hot water; and the clay mineral is dispersed in the hydrophilic resin composition in a ratio of 1 to 180 mass parts relative to 100 mass parts of the hydrophilic resin.

As yet another embodiments, the third present invention provides a hydrophilic resin composition for removing radioactive iodine and radioactive cesium exhibiting a function capable of immobilizing both of radioactive iodine and radioactive cesium present in liquid and/or a solid matter, wherein the hydrophilic resin composition comprises a hydrophilic resin and a clay mineral; the hydrophilic resin is at least one selected from the group consisting of a hydrophilic polyurethane resin, a hydrophilic polyurea resin, and a hydrophilic polyurethane-polyurea resin each having a hydrophilic segment, and each obtained by reacting an organic polyisocyanate, a high molecular weight hydrophilic polyol and/or polyamine being a hydrophilic component, and a compound having at least one active hydrogen-containing group and at least one tertiary amino group in the same molecule; and the clay mineral is dispersed in the hydrophilic resin composition in a ratio of at least 1 to 180 mass parts relative to 100 mass parts of the hydrophilic resin.

As another embodiment, the fourth present invention provides a hydrophilic resin composition for removing radioactive iodine and radioactive cesium having a function capable of immobilizing both of radioactive iodine and radioactive cesium in liquid and/or a solid matter and comprising a hydrophilic resin and a clay mineral, wherein the hydrophilic resin is a resin having a hydrophilic segment, having, in the molecular chain thereof, a tertiary amino group and a polysiloxane segment, and formed from, as a part of a raw material, a polyol having at least one tertiary amino group or a polyamine having at least one tertiary amino group and a compound having at least one active hydrogen-containing group and a polysiloxane segment in the same molecule, the resin being insoluble to water and hot water; and the clay mineral is dispersed in the hydrophilic resin composition in a ratio of at least 1 to 180 mass parts relative to 100 mass parts of the hydrophilic resin.

As yet another embodiment, the fourth present invention provides a hydrophilic resin composition for removing radioactive iodine and radioactive cesium exhibiting a function capable of immobilizing both of radioactive iodine and radioactive cesium in liquid and/or a solid matter and comprising a hydrophilic resin and a clay mineral, wherein the hydrophilic resin is at least one selected from the group consisting of a hydrophilic polyurethane resin, a hydrophilic polyurea resin, and a hydrophilic polyurethane-polyurea resin each having a hydrophilic segment, further each having, in the main chain and/or a side chain in the structure thereof, a tertiary amino group and a polysiloxane segment, and each obtained by reacting an organic polyisocyanate, a high molecular weight hydrophilic polyol and/or polyamine being a hydrophilic component, a compound having at least one active hydrogen-containing group and at least one tertiary amino group in the same molecule, and a compound having at least one active hydrogen-containing group and a polysiloxane segment in the same molecule; and the clay mineral is dispersed in the hydrophilic resin composition in a ratio of at least 1 to 180 mass parts relative to 100 mass parts of the hydrophilic resin.

Preferable embodiments of the third or the fourth present invention relating to the above-described method for removing radioactive cesium or the above-described hydrophilic resin composition include: the hydrophilic segment is a polyethylene oxide segment; and the clay mineral is at least one selected from the group consisting of pyrophylite, Kaolinite, mica, smectite (montmorillonite), and vermiculite each having a layered structure.

Advantageous Effects of Invention

According to the first present invention or the second present invention, provided is a novel method for removing radioactive cesium that is capable of applying removal processing to radioactive cesium present in liquid or a solid matter simply and at low cost, furthermore does not require an energy source such as electricity, moreover can take in and stably immobilize the removed radioactive cesium within a solid, and is capable of reducing the volume of radioactive waste as necessary.

According to the first present invention, provided is a novel hydrophilic resin composition that has a function capable of immobilizing radioactive cesium, makes it possible to realize applying removal processing to radioactive cesium, and is capable of reducing the volume of radioactive waste as necessary because the main component of the hydrophilic resin composition is a resin composition. The remarkable effects of the present invention are achieved by an extremely simple method that utilizes the hydrophilic resin composition comprising a clay mineral dispersed in a hydrophilic resin having a hydrophilic segment in the structure thereof. The above-described hydrophilic resin is obtained by reacting, for example, an organic polyisocyanate with a high molecular weight hydrophilic polyol and/or polyamine (hereinafter, each of the polyol and the polyamine is referred to as a "hydrophilic component"), and, more specifically, examples of the hydrophilic resin include a hydrophilic polyurethane resin, a hydrophilic polyurea resin, and a hydrophilic polyurethane-polyurea resin each having the above-described structure.

Particularly, according to the second present invention, provided is a hydrophilic resin composition with high practicability that has a function capable of immobilizing radioactive cesium and realizes improvement in the water resistance and the blocking resistance (sticking resistance) of the surface when used in a form such as a film form at the time of removal processing, and thereby the removal processing of radioactive cesium can be realized in a better state. Furthermore, since the main component of the hydrophilic resin composition is a resin composition, a novel hydrophilic resin composition capable of also reducing the volume of radioactive waste as necessary is provided. These remarkable effects in the second present invention are achieved by an extremely simple method that utilizes the hydrophilic resin composition comprising a clay mineral dispersed therein together with a hydrophilic resin having a hydrophilic segment in the structure thereof and having, in the main chain and/or a side chain, a polysiloxane segment. The hydrophilic resin that characterizes the second present invention is obtained by reacting, for example, an organic polyisocyanate, a hydrophilic component, and a compound having at least one active hydrogen-containing group and a polysiloxane segment in the same molecule, and more specific examples of the hydrophilic resin include a hydrophilic polyurethane resin, a hydrophilic polyurea resin, and a hydrophilic polyurethane-polyurea resin each having the above-described structure.

According to the third present invention or the fourth present invention, provided is a novel technology that is capable of applying removal processing to radioactive iodine and radioactive cesium present in liquid or a solid matter simply and at low cost, furthermore does not require an energy source such as electricity, moreover can take in, fix and further stably immobilize the removed radioactive iodine and radioactive cesium within a solid, is capable of reducing the volume of radioactive waste as necessary, and is capable of applying removal processing to radioactive iodine and radioactive cesium together. According to the present invention, provide is a novel hydrophilic resin composition that has a function capable of immobilizing both of radioactive iodine and radioactive cesium, makes it possible to realize applying removal processing to radioactive iodine and radioactive cesium together, and is capable of reducing the volume of radioactive waste as necessary because the main component of the hydrophilic resin composition is a resin composition.

The remarkable effects in the third present invention are achieved by an extremely simple method that utilizes the hydrophilic resin composition obtained by dispersing a clay mineral in a hydrophilic resin such as a hydrophilic polyurethane resin, a hydrophilic polyurea resin, or a hydrophilic polyurethane-polyurea resin obtained by reacting an organic polyisocyanate, a hydrophilic component, and a compound having at least one active hydrogen-containing group and at least one tertiary amino group in the same molecule.

Particularly, according to the fourth present invention, provided is a hydrophilic resin composition with high practicability that has a function capable of immobilizing radioactive iodine and radioactive cesium and realizes improvement in the water resistance and the blocking resistance performance (sticking resistance) of the surface when used in a form such as a film form at the time of removal processing, and thereby the removal processing of radioactive iodine and radioactive cesium can be realized in a better state. The remarkable effects in the fourth present invention are achieved by the hydrophilic resin having a hydrophilic segment in the structure thereof, and having, in the molecular chain thereof, at least one tertiary amino group and a polysiloxane segment, and in more detail, the remarkable effects in the fourth present invention are achieved by an extremely simple method that utilizes the hydrophilic resin composition obtained by dispersing a clay mineral in a hydrophilic resin such as a hydrophilic polyurethane resin, a hydrophilic polyurea resin, or a hydrophilic polyurethane-polyurea resin obtained by reacting an organic polyisocyanate, a hydrophilic component, a compound having at least one active hydrogen-containing group and at least one tertiary amino group in the same molecule, and a compound having at least one active hydrogen-containing group and a polysiloxane segment in the same molecule.

DESCRIPTION OF EMBODIMENTS

Figure 1:
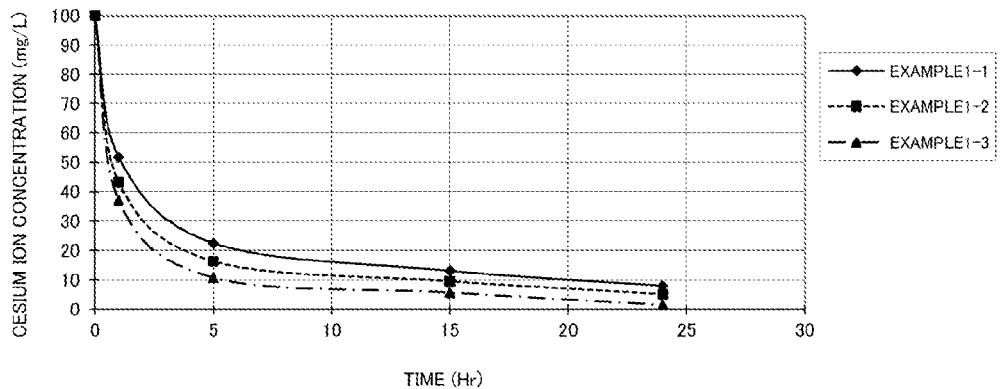
FIG. 1 is a graph showing the relation between the cesium concentration in each aqueous solution and the immersion time of each film made of a hydrophilic resin composition of Examples 1-1 to 1-3 according to the first present invention.

Next, each of the first present invention to the fourth present invention will be described in more detail giving preferable embodiments.

The first present invention and the second present invention relate to a method for removing radioactive cesium, and the main characteristic is to use a hydrophilic resin composition capable of immobilizing radioactive cesium, the hydrophilic resin composition comprising: a hydrophilic resin having a particular structure; and a clay mineral dispersed therein.

Moreover, the third present invention and the fourth present invention relate to a method for removing radioactive iodine and radioactive cesium, and the main characteristic is to use a hydrophilic resin composition capable of immobilizing both of radioactive iodine and radioactive cesium, the hydrophilic resin composition comprising: a hydrophilic resin having a particular structure; and a clay mineral dispersed therein.

Here, the "hydrophilic resin" in the present invention means a resin that has a hydrophilic group in the molecule thereof but is insoluble to water, hot water, and so on, and the hydrophilic resin in the present invention is clearly distinguished from a water soluble resin such as polyvinyl alcohols, polyvinyl pyrrolidones, polyacrylic acids, and cellulose derivatives.

Each of the hydrophilic resin compositions that characterize the first present invention to the fourth present invention comprises: a hydrophilic resin having a particular structure; and a clay mineral, and radioactive cesium can favorably be removed from a radioactive waste liquid or a radioactive solid matter in the case where any of the hydrophilic resin compositions is used. The present inventors consider as follows with regard to the reason why it becomes possible to remove radioactive cesium by using these hydrophilic resin compositions. First of all, any of the hydrophilic resins used in the first present invention to the fourth present invention has a hydrophilic segment in the structure thereof and therefore exhibits excellent water absorbency due to the presence of the hydrophilic segment. Thus, it is considered that ionized radioactive cesium that is an object of processing is quickly taken in the resin. And in any of the removal methods of the first present invention to the fourth present invention, the hydrophilic resin composition comprising a clay mineral dispersed therein in addition to a hydrophilic resin that exhibits such a water-absorbing function is used, and, as will be described later, it is known that selective adsorption or the like of a cesium ion occurs on the clay mineral and the clay mineral can be utilized for the removal of the cesium ion. It is considered that since the above-described hydrophilic resin capable of quickly taking in ionized radioactive cesium that is an object of processing and the clay mineral are present together in any of the hydrophilic resin compositions that characterize the present invention, radioactive cesium is fixed to the dispersed clay mineral more quickly and more effectively and immobilized by the resin, and, as a result thereof, the effective removal of radioactive cesium can be achieved in the first present invention to the fourth present invention. In addition, according to the third present invention and the fourth present invention in which the resins the structures of which are different from the structures of the resins used in the first present invention and the second present invention are respectively used as a hydrophilic resin, it becomes possible to apply removal processing to not only radioactive cesium as described above, but also both of radioactive iodine and radioactive cesium, however the reason for this will be described later.

[Clay Mineral]

It is preferable to use, among others, a crystalline clay mineral having a layered structure as the clay mineral used in the present invention. The clay minerals are produced in such a way that the serpentine or olivine which is a silicate mineral is decomposed by being subjected to hydrothermal action or the like, then the plate crystals of the decomposed products are stacked, and the stacked crystals are gradually changed to clay while water is penetrated in the gaps among crystals and the stacked crystals are continuously received a great pressure, however the clay minerals are generally soft, and it is known that various kinds of clay minerals exist depending on the differences in the layered structure or depending on the substances interposed between the layers. And, it has been reported in the investigations regarding the radioactive contamination to soils conducted upon the previous Fukushima No. 1 nuclear power plant accident that the radioactive cesium in soil is adsorbed to the clay minerals and radioactive cesium is strongly immobilized to the 2:1 type clay minerals. In the present invention as well, it is effective to use the clay mineral to which radioactive cesium is easily adsorbed and immobilized, and therefore it is preferable to use the clay mineral that is classified as the 2:1 type clay mineral. Specific examples of the clay mineral that is classified as the 2:1 type clay mineral include pyrophylite, mica, smectite, vermiculite, and so on, however kaolinite or the like that is classified as a 1:1 type clay mineral can also be used. The main component of the clay mineral is a layered silicate mineral, and the 2:1 type clay mineral for example takes a structure in which: a silicon tetrahedral sheet made of silicon and oxygen is formed in such a way that a plurality of layers each having an aluminum octahedral sheet, as a unit, made of aluminum and oxygen are stacked; the sheet has a negative charge attributable to a phenomenon in which a part of silicon in the silicon tetrahedral sheet is replaced with aluminum; and the negative charge is neutralized by sodium, potassium, and calcium ions, etc. Thus, in the clay minerals, planes in which metal cations (such as aluminum, sodium, potassium, and calcium cations) and silicic acid are coupled are formed in layers, and these metal cations have a characteristic of being replaced by one of the other metal cations with each other in aqueous solutions.

Here, the order of priority of the ion exchange in the cations of the clay mineral is as follows.

<Ion Exchange Order>

Cesium (Cs)>rubidium (Rb)>ammonium ($NH_4$)>barium (Ba)>strontium (Sr)>sodium (Na)>calcium (Ca)>iron (Fe)>aluminum (Al)>magnesium (Mg)>lithium (Li)

As described above, since the ion exchange order of cesium and strontium is high, it is considered that the ion exchange property that the clay mineral has can be utilized for removing radioactive substances such as radioactive cesium, and this is publicly known. In the first present invention to the fourth present invention, the technology capable of applying removal processing to radioactive cesium more efficiently, simply, and economically are provided by using a hydrophilic resin composition comprising the above-described clay mineral dispersed therein in addition to a hydrophilic resin. Above all, in the second present invention and the fourth present invention, the technology which is more excellent in practicability and by which radioactive cesium can be quickly taken in and removal processing can be applied to radioactive cesium further more efficiently, simply, and economically is provided by using the hydrophilic resin composition obtained by dispersing a clay mineral in a hydrophilic resin having a particular structure, the hydrophilic resin allowing the water resistance and the blocking resistance of the surface to improve in the case where the hydrophilic resin composition is used as a film or the like. Hereinafter, each hydrophilic resin that constitutes the first present invention to the fourth present invention will be described in detail.

[Hydrophilic Resin]
(First Hydrophilic Resin)

The hydrophilic resin that characterizes the first present invention (hereinafter, referred to as the first hydrophilic resin) has a characteristic of having a hydrophilic segment comprising a hydrophilic component as a constituent unit. That is to say, the first hydrophilic resin may comprise at least one hydrophilic resin such as a hydrophilic polyurethane resin, a hydrophilic polyurea resin, or a hydrophilic polyurethane-polyurea resin each having a hydrophilic segment comprising a hydrophilic component as a constituent unit in the structure thereof. Each hydrophilic segment in these hydrophilic resins is randomly bonded through a urethane bond, a urea bond, a urethane-urea bond, or the like in the case where a chain extender is not used at the time of synthesizing the hydrophilic resin. Moreover, in the case where the chain extender is used at the time of synthesizing the hydrophilic resin, the structure is made so that a short chain that is a residue of the chain extender is present, together with the above-described bonds, between the above-described bonds.

Furthermore, the first hydrophilic resin composition that can be utilized for the method for removing radioactive cesium in the first present invention (hereinafter, referred to as the first hydrophilic resin composition) has a characteristic of comprising the above-described first hydrophilic resin. The hydrophilic resin has a characteristic of using at least one selected from the resins listed above, the resins having a hydrophilic segment comprising a hydrophilic component as a constituent unit and, as described previously, the hydrophilic resin exhibits insolubility to water and hot water.

The above-described first hydrophilic resin having a hydrophilic segment is obtained by reacting, for example, an organic polyisocyanate with a compound having a high molecular weight hydrophilic polyol and/or polyamine being a hydrophilic component. Hereinafter, compounds used in the synthesis of the first hydrophilic resin will be described.

As a hydrophilic component used in the synthesis of the first hydrophilic resin, for example, a high molecular weight hydrophilic polyol and/or polyamine having, at a terminal thereof, a hydrophilic group such as a hydroxy group, an amino group, or a carboxyl group and having a weight average molecular weight in a range of 400 to 8000 are preferable. The weight average molecular weight here is a value in terms of polystyrene measured by GPC, and the same applies anywhere below. More specifically, the hydrophilic component is, for example, a hydrophilic polyol having a hydroxy group at a terminal thereof, and examples thereof include polyethylene glycols, polyethylene glycol/polytetramethylene glycol copolyols, polyethylene glycol/polypropylene glycol copolyols, polyethylene glycol adipate polyols, polyethylene glycol succinate polyols, polyethylene glycol/poly ϵ-lactone copolyols, polyethylene glycol/polyvalero lactone copolyols, and so on.

Moreover, the hydrophilic component used in the synthesis of the first hydrophilic resin is a hydrophilic polyamine having an amino group at a terminal thereof, and examples thereof include polyethylene oxide diamines, polyethylene oxide-propylene oxide diamines, polyethylene oxide triamines, polyethylene oxide-propylene oxide triamines, and so on. Other hydrophilic components include ethylene oxide adducts having a carboxyl group or a vinyl group, and so on.

The first hydrophilic resin can also be synthesized using another polyol, polyamine, polycarboxylic acid, or the like not having a hydrophilic chain together with the above-described hydrophilic component for the purpose of imparting water resistance to the first hydrophilic resin.

The organic polyisocyanate used in the synthesis of the first hydrophilic resin is not particularly limited, and any of publicly known organic polyisocyanates used in the conventional synthesis of polyurethane resins can be used. As a preferable organic polyisocyanate, for example, 4,4'-diphenylmethane-diisocyanate (hereinafter, abbreviated as MDI), dicyclohexylmethane-4,4'-diisocyanate (hereinafter, abbreviated as hydrogenated MDI), isophorone diisocyanate, 1,3-xylylene diisocyanate, 1,4-xylylene diisocyanate, 2,4-tolylene diisocyanate, m-phenylene diisocyanate, p-phenylene diisocyanate, and so on can be used, or polyurethane prepolymers or the like obtained by reacting the above organic polyisocyanate with a low molecular weight polyol or polyamine so as to form a terminal isocyanate can also be used.

Moreover, as a chain extender used as necessary in synthesizing the first hydrophilic resin, any of the publicly known conventional chain extenders such as, for example, a low molecular weight diol and diamine can be used without particular limitation. Specific examples of the chain extender include ethylene glycol, 1,3-propanediol, 1,4-butanediol, 1,5-pentanediol, ethylenediamine, hexamethylenediamine, and so on.

It is preferable that the first hydrophilic resin having a hydrophilic segment in the molecular chain thereof, the first hydrophilic resin obtained by reacting the above described raw material components, has a weight average molecular weight (a value in terms of standard polystyrene measured by GPC, the same applies hereinafter) in a range of 3000 to 800000. More preferable weight average molecular weight is in a range of 5000 to 500000.

It is preferable that the content of the hydrophilic segment in the particularly suitable first hydrophilic resin that can be utilized for the method for removing radioactive cesium of the first present invention is in a range of 20 to 80 mass %, more preferably in a range of 30 to 70 mass %. It is not preferable that a resin having a hydrophilic segment content of less than 20 mass % is used because the hydrophilic resin tends to be inferior in water-absorbing performance and the radioactive cesium-removing property tends to be deteriorated. On the other hand, it is not preferable that the resin having a hydrophilic segment content exceeding 80 mass % is used because the hydrophilic resin becomes inferior in water resistance.

(Second Hydrophilic Resin)

The hydrophilic resin that characterizes the second present invention (hereinafter, referred to as the second hydrophilic resin) comprises any one of a hydrophilic polyurethane resin, a hydrophilic polyurea resin, and a hydrophilic polyurethane-polyurea resin each having a hydrophilic segment comprising a hydrophilic component as a constituent unit and further each having, in the main chain and/or a side chain in the structure thereof, a polysiloxane segment. Each of these segments is randomly bonded through a urethane bond, a urea bond, a urethane-urea bond, or the like in the case where a chain extender is not used at the time of synthesizing the second hydrophilic resin. In the case where the chain extender is used at the time of synthesizing the second hydrophilic resin, the structure is made so that a short chain that is a residue of the chain extender is present, together with the above-described bonds, between the above-described bonds.

The second hydrophilic resin has a hydrophilic segment in the structure thereof in the same way as in the case of the previously described first hydrophilic resin and, in addition to this, further has a polysiloxane segment in the structure thereof. By constituting the second hydrophilic resin as described here, more useful effect that the water resistance and the blocking resistance performance (sticking resistance) of the surface are improved can be obtained and it becomes possible to achieve the above-described intended purpose of the second present invention more favorably in the case where the resin is used in a form such as a resin film or sheet. Here, the polysiloxane segment introduced in the resin molecule is fundamentally hydrophobic (water-repellent), however in the case where the polysiloxane segment is introduced in the resin structure by an amount of a particular range, the resin is known to become a resin having "environmental responsiveness" (KOBUNSHI RONBUNSHU vol. 48, no. 4, 227(1991)). "Environmental responsiveness" in a resin as described in the literature is a phenomenon that the surface of the resin is completely covered by the polysiloxane segment in a dry state, however, in the state in which the resin is immersed in water, the polysiloxane segment is buried in the resin.

In the second present invention, the phenomenon of the "environmental responsiveness" exhibited by the resin is utilized for the removal processing of radioactive cesium by introducing a polysiloxane segment in the structure of the resin to be used, and thereby the processing is made more effective. The second hydrophilic resin used in the present invention exhibits an excellent water absorbency due to the hydrophilic segment present in the structure thereof in the same way as in the case of the aforementioned first hydrophilic resin, can quickly take in ionized radioactive cesium, and is effective for the removal processing of the ionized radioactive cesium. However, according to the studies of the present inventors, there has been a problem as will be described below in putting a hydrophilic resin into practical use in the case where the structural characteristic of the hydrophilic resin to be used is only to have a hydrophilic segment in the structure thereof. That is to say, it becomes necessary in applying the removal processing to radioactive cesium, for example, to make a resin composition to be used in a form such as a sheet form by applying a base material with the resin composition and a film form and to immerse the sheet or the film in the waste liquid containing radioactive cesium, or to make the sheet or the film as a cover for the solid matter containing radioactive cesium. In such cases, durability to the above-described removal processing of radioactive cesium is required for the resin film or the like to be used. However, in the case where the resin having such a structure as the structure of the aforementioned first hydrophilic resin, it has been hard to say that the durability is sufficient depending on the use state. The present inventors have made diligent studies against the problem and, as a result thereof, have found that the water resistance and the blocking resistance performance (sticking resistance) of the surface can be improved by further introducing a polysiloxane segment in the molecule (in the structure) of the hydrophilic resin to be used. That is to say, the resin constitution can be realized by which the resin film or the like exhibits a sufficient water resistant function and the like and more effective removal processing of radioactive cesium can be applied even in the case of the above-described use form by making the structure of resin so as to be a structure such as the structure of the second hydrophilic resin.

It is considered that, in the second present invention, the second hydrophilic resin composition in which the second hydrophilic resin exhibiting the above-described excellent function is contained and the clay mineral is dispersed is used for the removal processing of radioactive cesium and therefore the radioactive cesium has been fixed by the dispersed clay mineral more quickly and effectively and immobilized by the resin from the aforementioned reason.

Next, the description will be made with regard to a raw material for forming the second hydrophilic resin that can realize the above-described excellent performance. A preferable second hydrophilic resin is a hydrophilic resin having a hydrophilic segment in the structure thereof, having, in the main chain and/or a side chain in the structure thereof, a polysiloxane segment, and obtained by reacting an organic polyisocyanate, a high molecular weight hydrophilic polyol and/or polyamine being a hydrophilic component, and a compound having at least one active hydrogen-containing group and a polysiloxane segment in the same molecule. Specifically, the preferable second hydrophilic resin is a hydrophilic resin comprising any one of a hydrophilic polyurethane resin, hydrophilic polyurea resin, and a hydrophilic polyurethane-polyurea resin each having a polysiloxane segment. As described here, the second hydrophilic resin is obtained from, as a part of a raw material, the compound having at least one active hydrogen-containing group and a polysiloxane segment in the same molecule, and examples of a specific polysiloxane compound used for obtaining the second hydrophilic resin, the specific polysiloxane compound being usable for introducing a polysiloxane segment in the second hydrophilic resin molecule include the following compounds. The examples thereof include polysiloxane compounds having one or two or more reactive groups specifically such as an amino group, an epoxy group, a hydroxy group, a mercapto group, and a carboxyl group in the molecule. Preferable examples of the polysiloxane compound having the above-described reactive groups include the following compounds. In addition, a lower alkylene group in the following compounds means a lower alkylene group having about 1 to about 8 carbon atoms.

Amino-Modified Polysiloxane Compounds
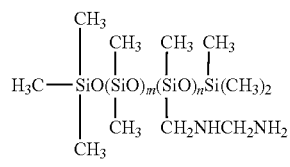
(m = 1 ~ 200, n = 2 ~ 200)
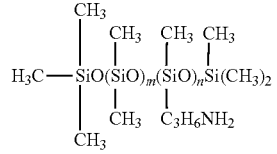
(m = 1 ~ 200, n = 2 ~ 200)
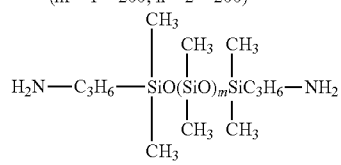
(m = 1 ~ 300)
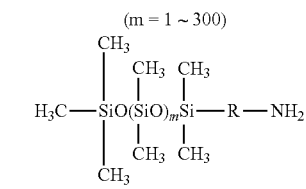
(m = 1 ~ 300, R = a lower alkylene group)
Alcohol-Modified Polysiloxane Compounds
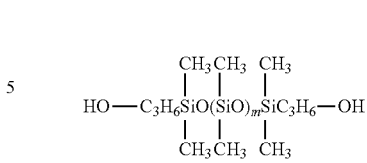
(m = 1~300)
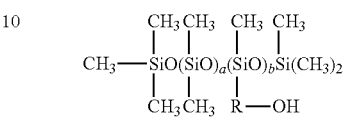
(a = 1~300, b = 2~200, R = a lower alkylene group)
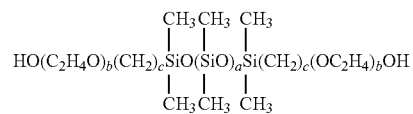
(a = 1~300, b = 1~300, c = 2~6)
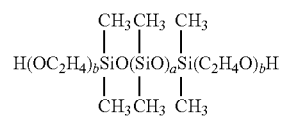
(a = 1~300, b = 1~300)
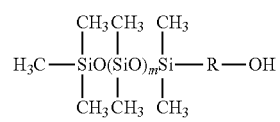
(m = 1~300, R = a lower alkylene group)
Epoxy-Modified Polysiloxane Compounds
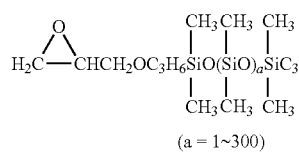
(a = 1~300)
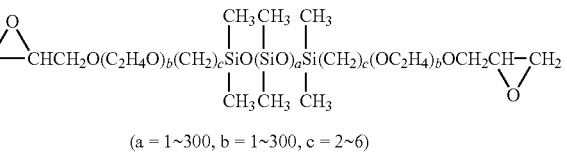
(a = 1~300, b = 1~300, c = 2~6)
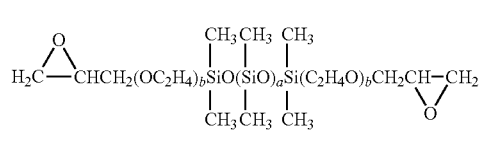
(a = 1~300, b = 1~300)
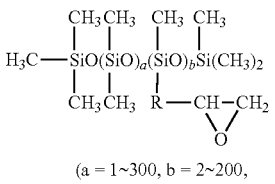
(a = 1~300, b = 2~200, R = a lower alkylene group)
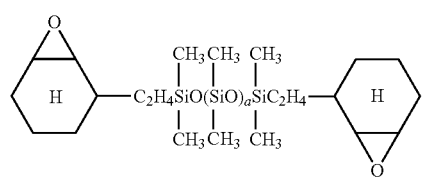
(a = 1~300)
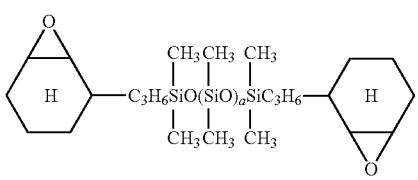
(a = 1~300)
(a = 1~300, R = lower alkylene group)

-continued

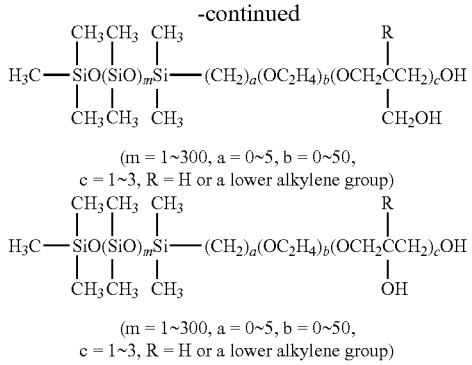

(m = 1~300, a = 0~5, b = 0~50,
c = 1~3, R = H or a lower alkylene group)

Mercapto-Modified Polysiloxane Compounds

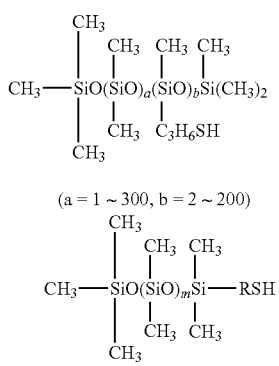

(a = 1 ~ 300, b = 2 ~ 200)

(m = 1 ~ 300, R = lower alkylene group)

Carboxyl-Modified Polysiloxane Compounds

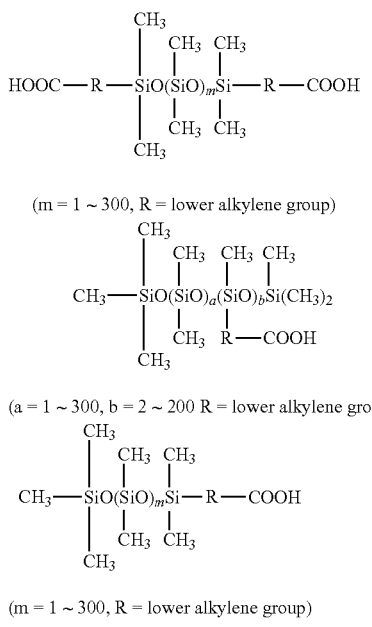

(m = 1 ~ 300, R = lower alkylene group)

(a = 1 ~ 300, b = 2 ~ 200 R = lower alkylene group)

(m = 1 ~ 300, R = lower alkylene group)

Among the polysiloxane compounds having an active hydrogen-containing group as described above, polysiloxane polyols and polysiloxane polyamines are particularly useful. In addition, any of the above-listed compounds is a preferable compound used in the second present invention, however the present invention is not limited to these exemplified compounds. Accordingly, not only above-described exemplified compounds but also any of other compounds currently sold and readily available from the market, the compounds having the similar constitution can be used in the second present invention.

As described previously, it is preferable to use a high molecular weight hydrophilic polyol and/or polyamine being a hydrophilic component in the synthesis of the second hydrophilic resin having a hydrophilic segment. A hydrophilic compound having a hydroxy group, an amino group, a carboxyl group, or the like and having a weight average molecular weight in a range of 400 to 8000 is preferable as such a hydrophilic component. The preferable specific examples of the hydrophilic component are the same as the preferable specific examples described previously in the first hydrophilic resin, and therefore the description is omitted. Moreover, the organic polyisocyanates and chain extenders described in the description of the first hydrophilic resin can also be used in addition to the hydrophilic component in synthesizing the second hydrophilic resin.

Another polyol, polyamine, polycarboxylic acid, and so on not having a hydrophilic chain can also be used together with the above-described hydrophilic component in the same way as in the case of the first hydrophilic resin for the purpose of imparting water resistance to the second hydrophilic resin.

It is preferable that the second hydrophilic resin having a hydrophilic segment and a polysiloxane segment in the molecular chain thereof, the second hydrophilic resin obtained using the above-described raw material components, has a weight average molecular weight in a range of 3000 to 800000. More preferable weight average molecular weight is in a range of 5000 to 500000.

It is preferable that the content of the polysiloxane segment in the second hydrophilic resin particularly suitable for use in the second present invention is in a range of 0.1 to 12 mass %, particularly preferably in a range of 0.5 to 10 mass %. It is not preferable that the content of the polysiloxane segment is less than 0.1 mass % because it is hard to say that the exhibition of the water resistance and the blocking resistance of the surface that is the intended purpose of the present invention is sufficient, and, on the other hand, it is not preferable that the content of the polysiloxane segment exceeds 12 mass % because the water repellency due to the polysiloxane segment becomes strong resulting in a tendency to deteriorate the water-absorbing performance.

Moreover, it is preferable that the content of the hydrophilic segment in the second hydrophilic resin particularly suitable for use in the second present invention is in a range of 20 to 80 mass %, further more preferably in a range of 30 to 70 mass %. It is not preferable that the content of the hydrophilic segment is less than 20 mass % because the water-absorbing performance tends to be deteriorated. On the other hand, it is not preferable that the content of the hydrophilic segment exceeds 80 mass % because the second hydrophilic resin becomes inferior in water resistance.

Hereinafter, the description will be made with regard to each hydrophilic resin used in the third or the fourth present invention, however in the third or the fourth present invention, there is a difference when compared with the above-described first or second present invention in that not only radioactive cesium present in a radioactive waste liquid or a radioactive solid matter but also both of radioactive iodine and radioactive cesium can be removed.

(Third Hydrophilic Resin)

The hydrophilic resin that characterizes the third present invention (hereinafter, referred to as the third hydrophilic resin) has a characteristic of having: a hydrophilic segment comprising a hydrophilic component as a constituent unit; and at least one tertiary amino group. The third hydrophilic resin may be a hydrophilic resin having: a hydrophilic segment comprising a hydrophilic component as a constituent unit; and at least one tertiary amino group; in the structure thereof. Each of these segments is randomly bonded through a urethane bond, a urea bond, a urethane-urea bond, or the like in the case where a chain extender is not used at the time of synthesizing the third hydrophilic resin. In the case where the chain extender is used at the time of synthesizing the third hydrophilic resin, the structure is made so that a short chain that is a residue of the chain extender is present, together with the above-described bonds, between the above-described bonds.

The third hydrophilic resin composition that can be utilized for the method for removing radioactive iodine and radioactive cesium in the third present invention (hereinafter, referred to as the third hydrophilic resin composition) comprises the third hydrophilic resin and a clay mineral, and it becomes possible to apply removal processing to both of radioactive iodine and radioactive cesium together by using the composition. The present inventors consider as follows with regard to the reason why such processing becomes possible. First of all, the third hydrophilic resin exhibits excellent water absorbency due to the hydrophilic segment in the structure thereof, and with regard to exhibiting excellent water absorbency, the third hydrophilic resin is similar to the hydrophilic resins that constitute the first or the second present invention the object of which is to remove radioactive cesium. Therefore, the effect on the removal of radioactive cesium similar to the effect of the first or the second present invention can be obtained also in the third present invention using the third hydrophilic resin.

In the third hydrophilic resin, a tertiary amino group is further introduced in the main chain and/or a side chain in the structure thereof, thereby an ion bond is formed between ionized radioactive iodine and the tertiary amino group, and, as a result thereof, radioactive iodine is considered to be fixed in the third hydrophilic resin in addition to the effect on the above-described removal of radioactive cesium. However, since the above-described ion bond easily dissociates under the presence of moisture, the fixed radioactive iodine is considered to be discharged again from the resin after a certain period of time is passed, and the present inventors have anticipated that it is difficult to remove radioactive iodine in a state in which the fixing state of radioactive iodine within the resin is immobilized even though the resin having the above-described constitution is used. However, as a result of studies by the present inventors, it has been found that the conically bonded radioactive iodine, in fact, remains to be fixed within the resin after a long period of time is passed. The reason is uncertain, however the present inventors consider as follows. That is to say, the present inventors estimate that, in the third hydrophilic resin used in the present invention, a hydrophobic part is also present in the molecule and the hydrophobic part surrounds, after the ion bond is formed between the tertiary amino group in the resin and radioactive iodine, the circumferences of the hydrophilic part (the hydrophilic segment) and the ion bond. It is considered from the reason as described here that radioactive iodine can be immobilized within the resin and the removal of radioactive iodine becomes possible by using the third hydrophilic resin composition comprising the third hydrophilic resin having a particular structure in the present invention.

Furthermore, as described in detail previously in the description of the first present invention and the second present invention, the third hydrophilic resin composition also comprises: a third hydrophilic resin having a hydrophilic segment; and further a clay mineral dispersed therein, therefore the removal processing of radioactive cesium in addition to the above-described removal of radioactive iodine also becomes possible, and, as a result thereof, it is considered that applying removal processing to both of radioactive iodine and radioactive cesium together has been achieved by the third present invention.

The third hydrophilic resin composition comprises the third hydrophilic resin, and the hydrophilic resin has a characteristic of having: a hydrophilic segment comprising a hydrophilic component as a constituent unit; and at least one tertiary amino group. Specific examples of the third hydrophilic resin include at least any one of a hydrophilic polyurethane resin, a hydrophilic polyurea resin, and a hydrophilic polyurethane-polyurea resin each having a hydrophilic segment and further each having, in the main chain and/or a side chain in the structure thereof, a tertiary amino group.

Such a hydrophilic resin is obtained by reacting an organic polyisocyanate, a high molecular weight hydrophilic polyol and/or polyamine being a hydrophilic component, and a compound having at least one active hydrogen-containing group and at least one tertiary amino group in the same molecule. That is to say, examples of a compound used for introducing a hydrophilic segment and a tertiary amino group in the structure of the third hydrophilic resin include a compound having at least one active hydrogen-containing group (reactive group) in the molecule and having, in the molecular chain thereof, a tertiary amino group. Examples of the compound having at least one active hydrogen-containing group include a compound having a reactive group such as an amino group, an epoxy group, a hydroxy group, a mercapto group, an acid halide group, a carboxyester group, and an acid anhydride group.

Preferable examples of the above-described tertiary amino group-containing compound having a reactive group include compounds represented by the following general formulas (1) to (3).

(1)

[in the formula (1), $R_1$ represents an alkyl group having 20 or less carbon atoms, an alicyclic group, or an aromatic group (which may be substituted with a halogen or an alkyl group), $R_2$ and $R_3$ each represent a lower alkylene group which may be linked through —O—, —CO—, —COO—, —NHCO—, —S—, —SO—, —SO$_2$—, or the like, X and Y each represent a reactive group such as —OH, —COOH, —NH$_2$, —NHR$_1$ (the definition of $R_1$ is the same definition as described above), or —SH, and X and Y may be the same or different; moreover, X and Y may be an epoxy group, an alkoxy group, an acid halide group, an acid anhydride group, or a carboxyester group capable of deriving the above reactive group.]

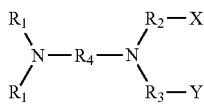
(2)

[in the formula (2), the definition of $R_1$, $R_2$, $R_3$, X, and Y is the same definition as in the above formula (1), however the two $R_1$ may form a cyclic structure; and $R_4$ represents —$(CH_2)_n$— (n in the formula is an integer of 0 to 20).]

$$X—W—Y \quad (3)$$

[in the formula (3), the definition of X and Y is the same definition as in the above formula (1), and W represents a nitrogen-containing heterocyclic ring, a nitrogen- and oxygen-containing heterocyclic ring, or a nitrogen- and sulfur-containing heterocyclic ring.]

Specific examples of the compounds represented by the above general formula (1), (2), and (3) include the following compounds. The compounds include, for example, N,N-dihydroxyethyl-methylamine, N,N-dihydroxyethyl-ethylamine, N,N-dihydroxyethyl-isopropylamine, N,N-dihydroxyethyl-n-butylamine, N,N-dihydroxyethyl-t-butylamine, methyliminobispropylamine, N,N-dihydroxyethylaniline, N,N-dihydroxyethyl-m-toluidine, N,N-dihydroxyethyl-p-toluidine, N,N-dihydroxyethyl-m-chloroaniline, N,N-dihydroxyethylbenzylamine, N,N-dimethyl-N',N'-dihydroxyethyl-1,3-diaminopropane, N,N-diethyl-N',N'-dihydroxyethyl-1,3-diaminopropane, N-hydroxyethyl-piperazine, N,N-dihydroxyethyl-piperazine, N-hydroxyethoxyethyl-piperazine, 1,4-bisaminopropyl-piperazine, N-aminopropyl-piperazine, dipicolinic acid, 2,3-diaminopyridine, 2,5-diaminopyridine, 2,6-diamino-4-methylpyridine, 2,6-dihydroxypyridine, 2,6-pyridine-dimethanol, 2-(4-pyridyl)-4,6-dihydroxypyrimidine, 2,6-diaminotriazine, 2,5-diaminotriazole, 2,5-diaminooxazole, and so on.

Moreover, an ethylene oxide adduct, a propylene oxide adduct, or the like of the above tertiary amino compounds may also be used in the present invention. Examples of the adduct include compounds represented by the following structural formula. In addition, m in the following formulas represents an integer of 1 to 60, and n represents an integer of 1 to 6.

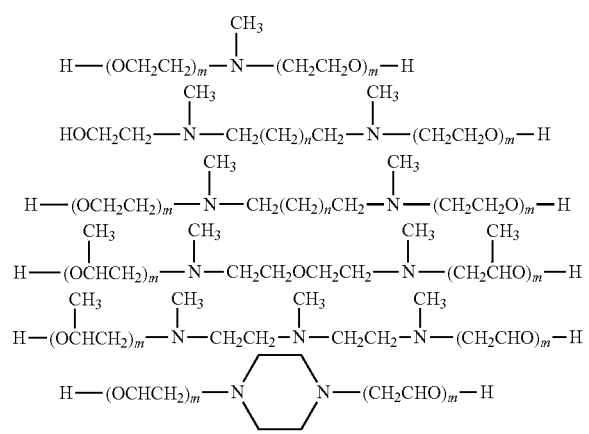

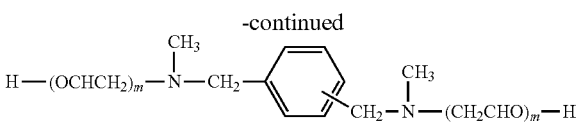

As the organic polyisocyanate used in the synthesis of the third hydrophilic resin, the organic polyisocyanates as listed in the description of the first hydrophilic resin can be used.

Moreover, as the hydrophilic component used together with the above-described organic polyisocyanate in the synthesis of the hydrophilic resin that characterizes the present invention, for example, a hydrophilic compound having a hydroxy group, an amino group, a carboxyl group, or the like at a terminal thereof and having a weight average molecular weight in a range of 400 to 8000 is preferable. The preferable specific examples of the hydrophilic component are the same as the preferable specific examples described previously in the description of the first hydrophilic resin, and therefore the description is omitted.

Another polyol, polyamine, polycarboxylic acid, or the like not having a hydrophilic chain can also be used together with the above-described hydrophilic component in the same way as in the case of the first hydrophilic resin for the purpose of imparting water resistance to the third hydrophilic resin. Moreover, as the chain extender used as necessary in synthesizing the third hydrophilic resin, any of the chain extenders described previously in the description of the first hydrophilic resin can be used.

It is preferable that the third hydrophilic resin obtained using the above-described raw material components, the third hydrophilic resin having a hydrophilic segment and having, in the molecular chain thereof, a tertiary amino group, has a weight average molecular weight in a range of 3000 to 800000. Further more preferable weight average molecular weight is in a range of 5000 to 500000.

As the particularly suitable third hydrophilic resin when used for the method for removing radioactive iodine and radioactive cesium of the third present invention, it is preferable that the content of the tertiary amino group in the resin is 0.1 to 50 eq (equivalent)/kg, further more preferably 0.5 to 20 eq/kg. It is not preferable that the content of the tertiary amino group is less than 0.1 eq/kg, namely less than 1 amino group per 10000 molecular weight, because the exhibition of the radioactive iodine-removing property that is the intended purpose of the third present invention becomes insufficient. On the other hand, it is not preferable that the content of the tertiary amino group exceeds 50 eq/kg, namely exceeding 500 amino groups per 10000 molecular weight, because the hydrophobicity becomes strong due to reduction of the hydrophilic part in the resin and the third hydrophilic resin becomes inferior in water-absorbing performance.

Moreover, it is preferable that the content of the hydrophilic segment in the particularly suitable third hydrophilic resin in the case where the third hydrophilic resin is used in the third present invention is in a range of 30 to 80 mass %, further more preferably in a range of 50 to 75 mass %. It is not preferable that the content of the hydrophilic segment is less than 30 mass % because the third hydrophilic resin becomes inferior in water-absorbing performance and the radioactive iodine-removing property becomes deteriorated. On the other hand, it is not preferable that the content of the hydrophilic segment exceeds 80 mass % because the third hydrophilic resin becomes inferior in water resistance.

(Fourth Hydrophilic Resin)

Hereinafter, the description will be made with regard to the hydrophilic resin used in the fourth present invention. Also in the fourth present invention, both of radioactive iodine and radioactive cesium present in a radioactive waste liquid or a radioactive solid matter can be removed together by using a hydrophilic resin having a particular structure together with the clay mineral in the same way as in the above-described third present invention. Furthermore, the hydrophilic resin used in the fourth present invention exhibits a sufficient water resistant function in the same way as in the case of the second hydrophilic resin described previously, and the practicability becomes further improved compared with the practicability of the third present invention by using the hydrophilic resin used in the fourth present invention.

The hydrophilic resin that characterizes the fourth present invention (hereinafter, referred to as the fourth hydrophilic resin) has a characteristic of having: a hydrophilic segment comprising a hydrophilic component as a constituent unit; a tertiary amino group-containing segment comprising a component having at least one tertiary amino group as a constituent unit; and a polysiloxane segment. That is to say, the fourth hydrophilic resin may be a hydrophilic resin having: a hydrophilic segment comprising a hydrophilic component as a constituent unit; a tertiary amino group-containing segment comprising a component having at least one tertiary amino group as a constituent unit; and a polysiloxane segment; in the structure thereof. Each of these segments is randomly bonded through a urethane bond, a urea bond, a urethane-urea bond, or the like in the case where a chain extender is not used at the time of synthesizing the fourth hydrophilic resin. In the case where the chain extender is used at the time of synthesizing the fourth hydrophilic resin, the structure is made so that a short chain that is a residue of the chain extender is present, together with the above-described bonds, between the above-described bonds.

The fourth hydrophilic resin composition that can be utilized for the method for removing radioactive iodine and radioactive cesium in the fourth present invention (hereinafter, referred to as the fourth hydrophilic resin composition) comprises: the fourth hydrophilic resin having a hydrophilic segment and a tertiary amino group in the structure thereof in the same way as in the case of the third hydrophilic resin; and a clay mineral. Therefore, it becomes possible to apply removal processing to both of radioactive iodine and radioactive cesium together by using the fourth hydrophilic resin composition in the same way as in the case of using the third hydrophilic resin composition comprising the third hydrophilic resin. The detailed reason is similar to the reason described previously in the case of the third hydrophilic resin composition, and therefore the description is omitted.

The fourth hydrophilic resin is required to be a hydrophilic resin having a polysiloxane segment in the structure thereof in addition to the above-described requirement. Here, as described in the description of the second hydrophilic resin, the polysiloxane segment introduced in the resin molecule is fundamentally hydrophobic (water-repellent), however in the case where the polysiloxane segment is introduced in the resin structure by an amount of a particular range, the resin is known to become a resin having "environmental responsiveness" (KOBUNSHI RONBUNSHU vol. 48, no. 4, p. 227 (1991)).

The fourth present invention utilizes the phenomenon of the "environmental responsiveness" exhibited by the resin by introducing a polysiloxane segment for the removal processing of radioactive iodine. As described previously, when an ion bond is formed between the tertiary amino group introduced in the hydrophilic resin used in the present invention and radioactive iodine that is an object of processing, the hydrophilicity of the resin is further increased, and thereby, conversely, there is a risk that the following problem occurs. That is to say, since the removal processing is applied immobilizing radioactive iodine and radioactive cesium as will be described later in the method for removing radioactive iodine and radioactive cesium of the third present invention, it is preferable that the third hydrophilic resin is used as a form such as, for example, a film form, however, in that case, when the amount of the radioactive iodine to be processed is too large, there is a risk that the radioactive iodine poses an obstacle for the water resistance required for the resin. Against this risk, the resin constitution by which the resin to be used exhibits a sufficient water resistant function and more effective removal processing can be applied is realized even in the above-described case by further introducing a polysiloxane segment in the molecule (in the structure) of the hydrophilic resin to be used in the fourth present invention. That is to say, the fourth hydrophilic resin can be made more useful when used in the removal processing of radioactive iodine as a result of realizing the water resistance of the resin and the blocking resistance performance (sticking resistance) of the surface by introducing a polysiloxane segment in addition to the water-absorbing performance due to the hydrophilic segment introduced in the structure thereof and the fixing performance to radioactive iodine due to the tertiary amino group.

Furthermore, in the fourth present invention, as described in the first present invention to the third present invention, the removal processing of radioactive cesium in addition to the above-described removal of radioactive iodine is also made possible by using the fourth hydrophilic resin composition comprising a clay mineral, and thereby the processing of radioactive iodine and radioactive cesium together is achieved.

Next, the description will be made with regard to a raw material for forming the fourth hydrophilic resin that realizes the above-described performance. The fourth hydrophilic resin has a characteristic of having a hydrophilic segment, a tertiary amino group, and a polysiloxane segment in the structure thereof. Therefore, it is preferable to use, as a part of a raw material, a polyol having at least one tertiary amino group or a polyamine having at least one tertiary amino group, and a compound having at least one active hydrogen-containing group and a polysiloxane segment in the same molecule for the purpose of obtaining the hydrophilic resin. It is preferable to use a tertiary amino group-containing compound as listed below as a compound for introducing the tertiary amino group in the fourth hydrophilic resin. That is to say, a compound having at least one active hydrogen-containing group (hereinafter, sometimes described as reactive group) such as, for example, an amino group, an epoxy group, a hydroxy group, a mercapto group, an acid halide group, a carboxyester group, and an acid anhydride group in the molecule and having, in the molecular chain thereof, a tertiary amino group is used. Preferable specific examples of the tertiary amino group-containing compound having a reactive group as described above are the same as the preferable specific examples described in the description of the third hydrophilic resin, and therefore the description is omitted.

Moreover, the fourth hydrophilic resin has a characteristic of having a polysiloxane segment in the structure thereof. Examples of the polysiloxane compound usable for introducing a polysiloxane segment in the fourth hydrophilic resin molecule include a compound having one or two or more of reactive groups such as, for example, an amino group, an epoxy group, a hydroxy group, a mercapto group, and a carboxyl group in the molecule. Preferable examples of the polysiloxane compound having the reactive groups as described above are the same as the preferable examples described in the description of the second hydrophilic resin, and therefore the description is omitted.

Another polyol, polyamine, polycarboxylic acid, or the like not having a hydrophilic chain can be used together with the above-described hydrophilic component in the same way as in the case of the first hydrophilic resin for the purpose of imparting water resistance to the fourth hydrophilic resin. Moreover, as the chain extender used as necessary in synthesizing the fourth hydrophilic resin and as the usable organic polyisocyanate, the chain extenders described previously in the description of the first hydrophilic resin can be used.

It is preferable that the fourth hydrophilic resin obtained using the above-described raw material components, the fourth hydrophilic resin having a hydrophilic segment and having, in the molecular chain thereof, a tertiary amino group and a polysiloxane segment, has a weight average molecular weight in a range of 3000 to 800000. Further more preferable weight average molecular weight is in a range of 5000 to 500000.

It is preferable that the content of the tertiary amino group in the particularly suitable fourth hydrophilic resin used for the method for removing radioactive iodine and radioactive cesium of the fourth present invention is in a range of 0.1 to 50 eq (equivalent)/kg, further more preferably 0.5 to 20 eq/kg. It is not preferable that the content of the tertiary amino group is less than 0.1 eq/kg, namely less than 1 amino group per 10000 molecular weight, because the exhibition of the radioactive iodine removing-property that is the intended purpose of the fourth present invention becomes insufficient, and, on the other hand, it is not preferable that the content of the tertiary amino group exceeds 50 eq/kg, namely exceeding 500 amino groups per 10000 molecular weight, because the hydrophobicity becomes strong due to reduction of the hydrophilic part in the resin and the fourth hydrophilic resin becomes inferior in water-absorbing performance.

Moreover, the content of the polysiloxane segment in the resin as the particularly suitable fourth hydrophilic resin used for the method for removing radioactive iodine and radioactive cesium of the fourth present invention is in a range of 0.1 to 12 mass %, particularly preferably 0.5 to 10 mass %. It is not preferable that the content of the polysiloxane segment is less than 0.1 mass % because the exhibition of the water resistance and the blocking resistance of the surface that is the intended purpose of the present invention becomes insufficient, and, on the other hand, it is not preferable that the content of the polysiloxane segment exceeds 12 mass % because water repellency due to the polysiloxane segment becomes strong, the water-absorbing performance is deteriorated, and the radioactive iodine-removing property is inhibited.

Moreover, it is preferable that the content of the hydrophilic segment in the particularly suitable fourth hydrophilic resin in the case where the fourth hydrophilic resin is used in the fourth present invention is in a range of 30 to 80 mass %, further more preferably in a range of 50 to 75 mass %. When the content of the hydrophilic segment is less than 30 mass %, the water-absorbing performance of the fourth hydrophilic resin is deteriorated and the radioactive iodine-removing property becomes lowered. On the other hand, it is not preferable that the content of the hydrophilic segment exceeds 80 mass % because the fourth hydrophilic resin becomes inferior in water resistance.

[Method for Producing Hydrophilic Resin Composition]

The hydrophilic resin composition that is suitable for the method for removing radioactive cesium in the first or the second present invention and the method for removing radioactive iodine and radioactive cesium in the third or the fourth present invention is obtained by dispersing a clay mineral in addition to any one of the above-described hydrophilic resins of the first present invention to the fourth present invention. Specifically, the hydrophilic resin composition can be produced by putting a clay mineral and a dispersion solvent into any one of the first to the fourth hydrophilic resins as described above and carrying out dispersion operation by a prescribed disperser. As the disperser used for the dispersion, any disperser usually used for pigment dispersion can be used without any problem. Examples of the disperser include a paint conditioner (manufactured by Red Devil, Inc.), a ball mill and a pearl mill (both manufactured by Eirich GmbH), a sand mill, a visco mill, an atliter mill, a basket mill, a wet jet mill (all manufactured by Genus Corporation), and so on, however it is preferable to select the disperser taking dispersion performance and economy into consideration. Moreover, as a dispersion medium, a glass bead, a zirconia bead, an alumina bead, a magnetic bead, a stainless steel bead, or the like can be used.

In any of the first invention to the fourth invention, the hydrophilic resin composition in which 1 to 180 mass parts of the clay mineral relative to 100 mass parts of the hydrophilic resin is blended as a dispersion ratio of the clay mineral to the hydrophilic resin each constituting the hydrophilic resin composition is used. It is not preferable that the dispersion ratio of the clay mineral is less than 1 mass part because there is a risk that the removal of radioactive cesium becomes insufficient, and it is not preferable that the dispersion ratio of the clay mineral exceeds 180 mass parts because mechanical properties of the composition become weak, the composition becomes inferior in water resistance, and there is a risk that the composition cannot maintain the shape thereof in radiation-contaminated water. More preferably, the hydrophilic resin composition in which the clay mineral is blended in a ratio of 10 to 120 mass parts relative to 100 mass parts of the hydrophilic resin is used. It is further preferable to use the clay mineral having a particle diameter of 30 μm or less from the standpoint of a high adsorption property to cesium.

In addition, in determining the formulation ratio of the hydrophilic resin to the clay mineral in the hydrophilic resin composition of the third present invention or the fourth present invention, it is also necessary to consider the point that ions after ion exchange are solved out from within the clay mineral to the aqueous solution depending on the aforementioned ion exchange order of the clay mineral.

In carrying out the method for removing radioactive cesium of the first or the second present invention and the method for removing radioactive iodine and radioactive cesium of the third or the fourth present invention, it is preferable to use any one of the first to the fourth hydrophilic resin compositions comprising the above-described constitution in the following form. That is to say, the form includes the hydrophilic resin composition formed in a film form obtained by applying a solution of the hydrophilic resin composition on a releasable substrate such as release paper or a release film so that a thickness after drying becomes 5 to 200 μm, preferably 10 to 100 μm and drying in a drying furnace is given as an example. In this case, the hydrophilic composition is used as a film for removing radioactive cesium or for removing radioactive iodine and radioactive cesium released from the release paper, the release film, or the like at the time of use. Moreover, besides the film form, a resin solution obtained from the raw material described previously may be used by applying the resin solution on various base materials or immersing various base materials in the resin solution. As the base material in this case, a metal, glass, timber, fiber, various plastics, and so on can be used.

By immersing the film made of the first or the second hydrophilic resin composition or the sheet obtained by applying the first or the second hydrophilic resin composition on various base materials, the film or the sheet obtained as described above, in a radioactive waste liquid, a waste liquid in which a radioactive solid matter is decontaminated with water in advance, or the like, radioactive cesium present in these liquids can be removed. Moreover, against a radiation-contaminated solid matter or the like, the diffusion of radioactive cesium can be prevented by covering the solid matter or the like with the film or the sheet made of the first or the second hydrophilic resin composition. As described previously, particularly in the case where the second hydrophilic resin composition is used, the second hydrophilic resin composition is more useful for removal processing of radioactive iodine because the water resistance of the film or the like and the blocking resistance performance (sticking resistance) of the surface can be realized.

Moreover, by immersing the film made of the third or the fourth hydrophilic resin composition or the sheet obtained by applying the third or the fourth hydrophilic resin composition on various base materials, the film or the sheet obtained as described above, in a radioactive waste liquid, a waste liquid in which a radioactive solid matter is decontaminated with water in advance, or the like, both of radioactive iodine and radioactive cesium can selectively be removed. Moreover, against a radiation-contaminated solid matter or the like, the diffusion of radioactive iodine and radioactive cesium can be prevented by covering the radiation-contaminated solid matter or the like with the film or the sheet made of the third or the fourth hydrophilic resin composition. As described previously, particularly in the case where the fourth hydrophilic resin composition is used, the fourth hydrophilic resin composition is more useful for removal processing of radioactive iodine because the water resistance of the film or the like and the blocking resistance performance (sticking resistance) of the surface can be realized.

The film or the sheet made of the first or the second hydrophilic resin composition is insoluble to water and therefore can easily be taken out from the waste liquid after decontamination. Thereby, decontamination can be carried out simply and at low cost without the need for special facilities and electricity in removing radioactive cesium. Furthermore, the effect of volume reduction of radioactive waste can be expected by drying the absorbed moisture and heating the film or the sheet at a temperature of 120 to 220° C. in the case of heating the film made of the first hydrophilic resin composition and 120 to 220° C. in the case of heating the film made of the second hydrophilic resin composition because the resin softens and the contraction of volume occurs.

Moreover, the film or the sheet made of the third or the fourth hydrophilic resin composition is insoluble to water and therefore can easily be taken out from the waste liquid after decontamination. Thereby, decontamination can be carried out simply and at low cost without the need for special facilities and electricity in removing both of radioactive iodine and radioactive cesium. Furthermore, the effect of volume reduction of radioactive waste can be expected by drying the absorbed moisture and heating the film or the sheet at a temperature of 120 to 220° C. because the resin softens and the contraction of volume occurs.

EXAMPLES

Next, the first present invention to the fourth present invention will be described in more detail giving specific Production Examples, Examples, and Comparative Examples, however the first present invention to the fourth present invention are not limited to these examples. Moreover, "parts" and "%" in the following respective examples are based on mass unless otherwise noted.

Examples and Comparative Examples According to First Present Invention and Second Present Invention Production Example 1-1

Synthesis of Hydrophilic Polyurethane Resin as First Hydrophilic Resin

A reaction vessel equipped with a stirrer, a thermometer, a gas introducing tube, and a reflux cooler was purged with nitrogen, and in the reaction vessel, 150 parts of polyethylene glycol (molecular weight 2040) and 20 parts of 1,4-butanediol were dissolved in a mixed solvent of 150 parts of methyl ethyl ketone (hereinafter, abbreviated as MEK) and 200 pars of dimethylformamide (hereinafter, abbreviated as DMF), and the resultant solution was stirred well at 60° C. And a solution obtained by dissolving 77 parts of hydrogenated MDI in 50 parts of MEK was slowly dropped into the mixture under stirring. After the completion of dropping, the resultant mixture was subjected to reaction at 80° C. for 7 hours, thereafter 60 parts of MEK was added to the reaction mixture to obtain a hydrophilic resin solution to be used in Example of the first present invention. The resin solution had a viscosity of 280 dPa·s (25° C.) at a solid content of 35%. Moreover, a hydrophilic resin film formed from the resin solution had a breaking strength of 32.5 MPa, a breaking elongation of 450%, a thermal softening temperature of 115° C., and a weight average molecular weight of 78000. The weight average molecular weight is a value in terms of standard polystyrene measured by GPC, and the same applies hereinafter.

Production Example 1-2

Synthesis of Hydrophilic Polyurea Resin as First Hydrophilic Resin

In a reaction vessel similar to the reaction vessel used in Production Example 1-1, 150 parts of polyethylene oxide diamine ("JEFFAMINE ED" (product name) manufactured by Huntsman Corporation; molecular weight 2000) and 18 parts of 1,4-diaminobutane were dissolved in 250 parts of DMF. And a solution obtained by dissolving 73 parts of hydrogenated MDI in 100 parts of DMF was slowly dropped into the resultant solution to react while the resultant solution was stirred well at an internal temperature of 20 to 30° C. After the completion of dropping, the internal temperature was gradually raised, and when the internal temperature reached 50° C., the resultant mixture was subjected to reaction for further 6 hours, thereafter 97 parts of DMF was added to the reaction mixture to obtain a hydrophilic resin solution to be used in Example of the first present invention. The resin solution had a viscosity of 210 dPa·s (25° C.) at a solid content of 35%. Moreover, a hydrophilic resin film formed from the resin solution had a breaking strength of 18.3 MPa, a breaking elongation of 310%, a thermal softening temperature of 145° C., and a weight average molecular weight of 67000.

Production Example 1-3

Synthesis of Hydrophilic Polyurethane-Polyurea Resin as First Hydrophilic Resin In a reaction vessel similar to the reaction vessel used in Production Example 1-1, 150 parts of polyethylene oxide diamine ("JEFFAMINE ED" (product name) manufactured by Huntsman Corporation; molecular weight 2000) and 15 parts of ethylene glycol were dissolved in 250 parts of DMF. And a solution obtained by dissolving 83 parts of hydrogenated MDI in 100 parts of MEK was slowly dropped into the resultant solution while the resultant solution was stirred well at an internal temperature of 20 to 30° C. After the completion of dropping, the resultant mixture was subjected to reaction at 80° C. for 6 hours, thereafter 110 parts of MEK was added to the reaction mixture to obtain a hydrophilic resin solution to be used in Example of the first present invention. The resin solution had a viscosity of 250 dPa·s (25° C.) at a solid content of 35%. Moreover, a hydrophilic resin film formed from the resin solution had a breaking strength of 14.7 MPa, a breaking elongation of 450%, a thermal softening temperature of 121° C., and a weight average molecular weight of 71000.

Production Example 2-1

Synthesis of Hydrophilic Polyurethane Resin Having Polysiloxane Segment as Second Hydrophilic Resin A reaction vessel equipped with a stirrer, a thermometer, a gas introducing tube, and a reflux cooler was purged with nitrogen, and in the reaction vessel, 8 parts of a polydimethylsiloxanepolyol having the following structure (molecular weight 3200), 142 parts of polyethylene glycol (molecular weight 2040), and 8 parts of ethylene glycol were dissolved in a mixed solvent of 150 parts of MEK and 140 parts of DMF. And a solution obtained by dissolving 52 parts of hydrogenated MDI in 50 parts of MEK was slowly dropped into the resultant solution while the resultant solution was stirred well at 60° C. After the completion of dropping, the resultant mixture was subjected to reaction at 80° C. for 6 hours, and thereafter 50 parts of MEK was added to the reaction mixture to obtain a solution of a hydrophilic polyurethane resin having a structure specified in the second present invention.

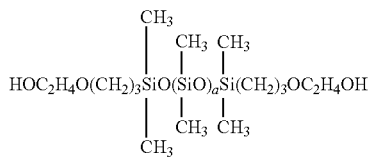

(a is an integer that gives a molecular weight of 3200)

The obtained resin solution had a viscosity of 410 dPa·s (25° C.) at a solid content of 35%. Moreover, a hydrophilic resin film formed from the resin solution had a breaking strength of 24.5 MPa, a breaking elongation of 450%, and a thermal softening temperature of 105° C.

Production Example 2-2

Synthesis of Hydrophilic Polyurea Resin Having Polysiloxane Segment as Second Hydrophilic Resin In a reaction vessel similar to the reaction vessel used in Production Example 2-1, 5 parts of a polydimethylsiloxanediamine having the following structure (molecular weight 3880), 145 parts of polyethylene oxide diamine ("JEFFAMINE ED" (product name) manufactured by Huntsman Corporation; molecular weight 2000), and 8 parts of propylene diamine were dissolved in 180 parts of DMF. And a solution obtained by dissolving 47 parts of hydrogenated MDI in 100 parts of DMF was slowly dropped into the resultant solution to react while the resultant solution was stirred well at an internal temperature of 10 to 20° C. After the completion of dropping, the internal temperature was gradually raised, and when the temperature reached 50° C., the resultant mixture was subjected to reaction for further 6 hours, and thereafter 100 parts of DMF was added to the reaction mixture to obtain a solution of a hydrophilic polyurea resin having a structure specified in the second present invention.

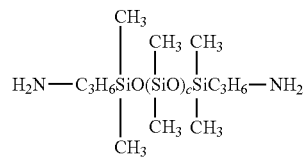

(c is an integer that gives a molecular weight of 3880)

The obtained resin solution had a viscosity of 250 dPa·s (25° C.) at a solid content of 35%. Moreover, a hydrophilic resin film formed from the resin solution had a breaking strength of 27.6 MPa, a breaking elongation of 310%, and a thermal softening temperature of 145° C.

Production Example 2-3

Synthesis of Hydrophilic Polyurethane-Polyurea Resin Having Polysiloxane Segment as Second Hydrophilic Resin In a reaction vessel similar to the reaction vessel used in Production Example 2-1, 5 parts of a polydimethylsiloxanediamine (molecular weight 3880) used in Production Example 2-2, 145 parts of polyethylene glycol (molecular weight 2040), and 8 parts of 1,3-butylene glycol were dissolved in a mixed solvent of 74 parts of toluene and 197 parts of MEK. And a solution obtained by dissolving 42 parts of hydrogenated MDI in 100 parts of MEK was slowly dropped into the resultant solution while the resultant solution was stirred well at 60° C. After the completion of dropping, the resultant mixture was subjected to reaction at 80° C. for 6 hours to obtain a solution of a hydrophilic polyurethane-polyurea resin having a structure specified in the second present invention. The obtained resin solution had a viscosity of 200 dPa·s (25° C.) at a solid content of 35%. Moreover, a film formed from the resin solution had a breaking strength of 14.7 MPa, a breaking elongation of 450%, and a thermal softening temperature of 90° C.

Production Example 4a

Synthesis of Non-Hydrophilic Polyurethane Resin to be Used in Comparative Example of First Present Invention and Second Present Invention A reaction vessel similar to the reaction vessel used in Production Example 1-1 was purged with nitrogen, and in the reaction vessel, 150 parts of polybutyleneadipate having an average molecular weight of about 2000 and 15 parts of 1,4-butanediol were dissolved in 250 parts of DMF. And a solution obtained by dissolving 62 parts of hydrogenated MDI in 100 parts of MEK was slowly dropped into the resultant solution while the resultant solution was stirred well at 60° C. After the completion of dropping, the resultant mixture was subjected to reaction at 80° C. for 6 hours, and thereafter 71 parts of MEK was added to the reaction mixture to obtain a non-hydrophilic resin solution to be used in Comparative Example of the first present invention and the second present invention. The resin solution had a viscosity of 320 dPa·s (25° C.) at a solid content of 35%. Moreover, a non-hydrophilic resin film formed from the solution had a breaking strength of 45 MPa, a breaking elongation of 480%, a thermal softening temperature of 110° C., and a weight average molecular weight of 82000.

Production Example 5a

Synthesis of Non-Hydrophilic Polyurethane-Polyurea Resin to be Used in Comparative Example of First Present Invention and Second Present Invention In a reaction vessel similar to the reaction vessel used in Production Example 1-1, 150 parts of polybutyleneadipate having an average molecular weight of about 2000 and 18 parts of hexamethylenediamine were dissolved in 200 parts of DMF. And a solution obtained by dissolving 60 parts of hydrogenated MDI in 100 parts of MEK was slowly dropped into the resultant solution while the resultant solution was stirred well at an internal temperature of 20 to 30° C. After the completion of dropping, the resultant mixture was subjected to reaction at 80° C. for 6 hours, and thereafter 123 parts of MEK was added to the reaction mixture to obtain a non-hydrophilic resin solution to be used in Comparative Example of the first present invention and the second present invention. The resin solution had a viscosity of 250 dPa·s (25° C.) at a solid content of 35%. Moreover, a non-hydrophilic resin film formed from the resin solution had a breaking strength of 14.7 MPa, a breaking elongation of 450%, a thermal softening temperature of 121° C., and a weight average molecular weight of 68000.

In Table 1, the property, the weight average molecular weight, and the content of the polysiloxane segment with regard to the respective resins obtained by respective Production Examples are listed together.

TABLE 1

Properties of respective resins obtained by respective Production Examples

| | Hydrophilic/Non-hydrophilic | Weight average molecular weight | Polysiloxane segment content (%) |
|---|---|---|---|
| Production Example 1-1 | Hydrophilic | 78000 | Not contained |
| Production Example 1-2 | Hydrophilic | 67000 | Not contained |
| Production Example 1-3 | Hydrophilic | 71000 | Not contained |
| Production Example 2-1 | Hydrophilic | 86000 | 3.6 |
| Production Example 2-2 | Hydrophilic | 71000 | 2.3 |
| Production Example 2-3 | Hydrophilic | 65000 | 2.4 |

TABLE 1-continued

Properties of respective resins obtained by respective Production Examples

| | Hydrophilic/Non-hydrophilic | Weight average molecular weight | Polysiloxane segment content (%) |
|---|---|---|---|
| Production Example 4a | Non-hydrophilic | 82000 | Not contained |
| Production Example 5a | Non-hydrophilic | 68000 | Not contained |

Examples 1-1 to 1-3 and Comparative Examples 1A to 2A of First Present Invention, and Examples 2-1 to 2-3 and Comparative Examples 1a to 2a of Second Present Invention Each of the resin solutions obtained by the above-described Production Examples and a clay mineral (main component: montmorillonite, product name "Kunipia", manufactured by Kunimine Industries Co., Ltd.) were used in respective combinations (represented on a mass basis) shown in Tables 2-1 and 2-2 and dispersed for 24 hours by a ball mill using a high density alumina ball (3.5 g/ml). And the contents after the dispersion were taken out through a 200 mesh sieve made of a polyester resin to obtain each resin composition comprising each resin solution and the clay mineral dispersed therein. The resin compositions of Examples and Comparative Examples with regard to the first present invention are shown in Table 2-1 together, and the resin compositions of Examples and Comparative Examples with regard to the second present invention are shown in Table 2-2 together.

TABLE 2-1

Preparation of resin compositions of Examples and Comparative Examples with regard to the first present invention [mass parts]

| | Example 1-1 | Example 1-2 | Example 1-3 | Comparative Example 1A | Comparative Example 2A |
|---|---|---|---|---|---|
| Resin solution of Production Example 1-1 | 100 | | | | |
| Resin solution of Production Example 1-2 | | 100 | | | |
| Resin solution of Production Example 1-3 | | | 100 | | |
| Resin solution of Production Example 4a | | | | 100 | |
| Resin solution of Production Example 5a | | | | | 100 |
| Clay mineral | 10 | 15 | 20 | 10 | 20 |
| Solvent (MEK/DMF = 5/5) | 70 | 85 | 100 | 70 | 100 |

TABLE 2-2

Preparation of resin compositions of Examples and Comparative Examples with regard to the second present invention [mass parts]

|  | Example 2-1 | Example 2-2 | Example 2-3 | Comparative Example 1a | Comparative Example 2a |
|---|---|---|---|---|---|
| Resin solution of Production Example 2-1 | 100 | | | | |
| Resin solution of Production Example 2-2 | | 100 | | | |
| Resin solution of Production Example 2-3 | | | 100 | | |
| Resin solution of Production Example 4a | | | | 100 | |
| Resin solution of Production Example 5a | | | | | 100 |
| Clay mineral | 15 | 20 | 25 | 15 | 25 |
| Solvent (MEK/DMF = 7/3) | 85 | 100 | 110 | 85 | 115 |

[Evaluation of First Present Invention and Second Present Invention]

The following tests were carried out using each resin composition of Examples and Comparative Examples of the second present invention to check the usefulness of each of the obtained resin compositions provided by the second present invention. Each resin composition having the formulation shown in Table 2-2 was applied on release paper and dried by heating at 110° C. for 3 minutes to volatilize the solvent, thereby forming each resin film having a thickness of about 20 μm. The following items were evaluated using each resin film thus obtained and formed from each resin composition of Examples 2-1 to 2-3 and Comparative Examples 1a and 2a of the second present invention.

<Blocking Resistance (Sticking Resistance) of Resin Film>

Film faces of each resin film of Examples 2-1 to 2-3 and Comparative Examples 1a and 2a formed from each resin composition were placed face to face, thereafter the films were left at 40° C. for 1 day while a load of 0.29 MPa was applied thereon. After that, the blocking property of the films with the faces placed face to face was visually observed and evaluated according to the following criteria. And the obtained results are shown in Table 3 together.

Good: No blocking property was observed.

Fair: The blocking property was slightly observed.

Poor: The blocking property was observed.

<Water Resistance of Resin Film>

Each resin film formed from each resin composition of Examples 2-1 to 2-3 and Comparative Examples 1a and 2a was cut in a shape having a thickness of 20 μm and a longitudinal length of 5 cm×a transversal length of 1 cm and immersed in water having a temperature of 25° C. for 12 hours, and the water resistance was evaluated by measuring the coefficient of expansion in the longitudinal direction of the immersed film. In addition, the coefficient of expansion (expansion rate) was calculated by the following method, and the water resistance was evaluated by rating a film having a coefficient of expansion of 200% or less as "Good" and a film having a coefficient of expansion of more than 200% as "Poor". The obtained results are shown in Table 3 together.

Coefficient of expansion (%)=(Longitudinal length after test/original longitudinal length)×100

TABLE 3

Evaluation results (blocking resistance and water resistance)

|  | Blocking resistance | Water resistance (Coefficient of expansion (%)) |
|---|---|---|
| Example 2-1 | Good | Good (155) |
| Example 2-2 | Good | Good (171) |
| Example 2-3 | Good | Good (188) |
| Comparative Example 1a | Poor | Good (105) |
| Comparative Example 2a | Poor | Good (103) |

(Evaluation of Removal of Cesium)

A cesium-removing function of each of the obtained resin compositions provided by the first present invention and the second present invention was checked in the following manner. Using each resin composition of Examples and Comparative Examples of the first present invention and the second present invention, each resin composition was applied on release paper and dried by heating at 110° C. for 3 minutes to volatilize the solvent, thereby forming each resin film having a thickness of about 20 μm. The effect on the removal of cesium ion was evaluated by the following method using each resin film of Examples and Comparative Examples of the first present invention and the second present invention thus obtained.

(Preparation of Cesium Solution for Evaluation Tests)

A cesium solution for the evaluation tests was prepared by dissolving cesium chloride in ion exchanged pure water so that the solution had a cesium ion concentration of 100 mg/L (100 ppm). In addition, when a cesium ion can be removed, radioactive cesium can be removed naturally.

(Evaluation Results with Regard to Resin Composition of Example 1-1 of First Present Invention)

In 100 ml of the cesium solution being prepared previously for evaluation tests and having an ion concentration of 100 ppm, 20 g of the resin film prepared using the hydrophilic resin composition of Example 1-1 was immersed (25° C.), and then the cesium ion concentration in the solution was measured by an ion chromatograph (IC2001 manufactured by Tosoh Corporation) every time a predetermined time was elapsed. In Table 4, the removing rate of the cesium ion in the solution measured every time a predetermined time was elapsed was listed together with the concentration of the cesium ion. Moreover, the result of the obtained change of the cesium ion concentration with time is shown in FIG. 1.

(Evaluation Results with Regard to Resin Compositions of Examples 1-2 and 1-3 of First Present Invention)

The cesium ion concentration in the solution was measured every time a predetermined time was elapsed in the same manner as in Example 1-1 except that 20 g of each resin film prepared by the hydrophilic resin composition of Example 1-2 or Example 1-3 was used for each test. The obtained results are shown in Table 4 and FIG. 1 in the same manner as in Example 1-1 described previously.

TABLE 4

Evaluation results in the case where the resin films of Examples
1-1 to 1-3 of the first present invention were used

| Immersion time (Hr) | Example 1-1 | | Example 1-2 | | Example 1-3 | |
|---|---|---|---|---|---|---|
| | Cesium ion concentration (ppm) | Cesium ion removing rate (%) | Cesium ion concentration (ppm) | Cesium ion removing rate (%) | Cesium ion concentration (ppm) | Cesium ion removing rate (%) |
| 0 | 100.0 | 0 | 100.0 | 0 | 100.0 | 0 |
| 1 | 51.8 | 48.2 | 43.3 | 56.7 | 37.1 | 62.9 |
| 5 | 22.5 | 77.5 | 16.4 | 83.6 | 10.8 | 89.2 |
| 15 | 13.1 | 86.9 | 9.6 | 90.4 | 5.7 | 94.3 |
| 24 | 8.0 | 92.0 | 5.2 | 94.8 | 1.5 | 98.5 |

(Evaluation Results with Regard to Resin Compositions of Examples 2-1 to 2-3 of Second Present Invention)

Figure 2:
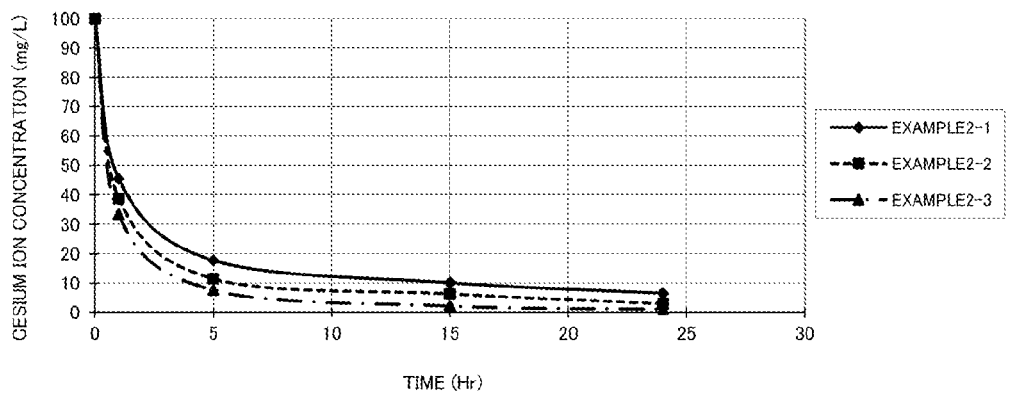
FIG. 2 is a graph showing the relation between the cesium concentration of each aqueous solution and the immersion time of each film made of a hydrophilic resin composition of Examples 2-1 to 2-3 according to the second present invention.

In 100 ml of the cesium solution being prepared previously for evaluation tests and having an ion concentration of 100 ppm, 20 g of each film made of hydrophilic resin compositions of Examples 2-1 to 2-3 was immersed and left standing (25° C.), then the cesium ion concentrations in the solutions were measured by an ion chromatograph (IC2001 manufactured by Tosoh Corporation) every time a predetermined time was elapsed, and the obtained results are shown in Table 5. The removing rates of the cesium ion in the solutions measured every time a predetermined time was elapsed were shown together in Table 5. Moreover, the results of obtained changes with time were shown in FIG. 2.

TABLE 5

Evaluation results in the case where the resin films of Examples
2-1 to 2-3 of the second present invention were used

| Immersion time (Hr) | Example 2-1 | | Example 2-2 | | Example 2-3 | |
|---|---|---|---|---|---|---|
| | Cesium ion concentration (ppm) | Cesium ion removing rate (%) | Cesium ion concentration (ppm) | Cesium ion removing rate (%) | Cesium ion concentration (ppm) | Cesium ion removing rate (%) |
| 0 | 100.0 | 0 | 100.0 | 0 | 100.0 | 0 |
| 1 | 45.5 | 54.5 | 38.8 | 61.2 | 33.3 | 66.7 |
| 5 | 17.7 | 82.3 | 11.5 | 88.5 | 7.6 | 92.4 |
| 15 | 10.1 | 89.9 | 6.3 | 93.7 | 2.0 | 98.0 |
| 24 | 6.5 | 93.5 | 2.8 | 97.2 | 0.9 | 99.1 |

(Evaluation Results with Regard to Resin Compositions of Comparative Examples 1A and 2A of First Present Invention and Comparative Examples 1a and 2a of Second Present Invention)

Figure 3:
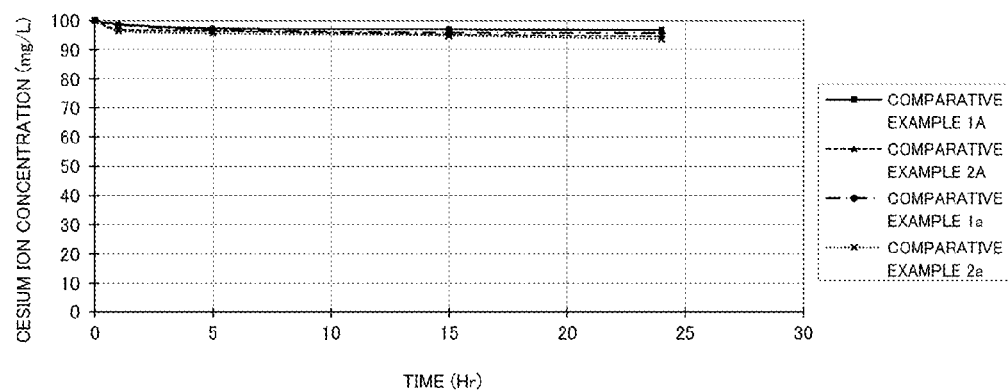
FIG. 3 is a graph showing the relation between the cesium concentration in each aqueous solution and the immersion time of each film made of a non-hydrophilic resin composition of Comparative Examples 1A and 2A to the first present invention and Comparative Examples 1a and 2a to the second present invention.

The cesium ion concentrations in the solutions were measured every time a predetermined time was elapsed in the same manner as in Example 1-1 except that 20 g of each resin film prepared by the non-hydrophilic resin composition of Comparative Example 1A or 2A, or Comparative Example 1a or 2a was used for each test. The obtained results are shown in Tables 6-1 and 6-2, and FIG. 3 in the same manner as in the case of Example 1-1 described previously. As clearly understood from these results, the superiority of the cesium ion-removing performance in Examples of the first present invention and the second present invention was confirmed.

TABLE 6-1

Evaluation results in the case where the films made
of resin compositions of Comparative Examples 1A
to 2A of the first present invention were used

| Immersion time (Hr) | Comparative Example 1A | | Comparative Example 2A | |
|---|---|---|---|---|
| | Cesium ion concentration (ppm) | Cesium ion removing rate (%) | Cesium ion concentration (ppm) | Cesium ion removing rate (%) |
| 0 | 100.0 | — | 100.0 | — |
| 1 | 98.7 | 1.3 | 97.0 | 3.0 |
| 5 | 97.3 | 2.7 | 96.5 | 3.5 |

TABLE 6-1-continued

Evaluation results in the case where the films made
of resin compositions of Comparative Examples 1A
to 2A of the first present invention were used

| Immersion time (Hr) | Comparative Example 1A | | Comparative Example 2A | |
|---|---|---|---|---|
| | Cesium ion concentration (ppm) | Cesium ion removing rate (%) | Cesium ion concentration (ppm) | Cesium ion removing rate (%) |
| 15 | 97.0 | 3.0 | 95.3 | 4.7 |
| 24 | 96.8 | 3.2 | 94.5 | 5.5 |

TABLE 6-2

Evaluation results in the case where the films made of resin compositions of Comparative Examples 1a to 2a of the second present invention were used

| | Comparative Example 1a | | Comparative Example 2a | |
|---|---|---|---|---|
| Immersion time (Hr) | Cesium ion concentration (ppm) | Cesium ion removing rate (%) | Cesium ion concentration (ppm) | Cesium ion removing rate (%) |
| 0 | 100.0 | 0 | 100.0 | 0 |
| 1 | 98.5 | 1.5 | 96.2 | 3.8 |
| 5 | 96.8 | 3.2 | 95.7 | 4.3 |
| 15 | 96.0 | 4.0 | 94.8 | 5.2 |
| 24 | 95.8 | 4.2 | 93.6 | 6.4 |

Examples and Comparative Examples According to Third Present Invention and Fourth Present Invention Production Example 3-1

Synthesis of Tertiary Amino Group-Containing Hydrophilic Polyurethane Resin as Third Hydrophilic Resin A reaction vessel equipped with a stirrer, a thermometer, a gas introducing tube, and a reflux condenser was purged with nitrogen, and in the reaction vessel, 150 parts of polyethylene glycol (molecular weight 2040), 20 parts of N-methyldiethanolamine, and 5 parts of diethylene glycol were dissolved in a mixed solvent of 200 parts of MEK and 150 parts of DMF, and the resultant solution was stirred well at 60° C. And a solution obtained by dissolving 74 parts of hydrogenated MDI in 112 parts of MEK was slowly dropped into the resultant solution under stirring. After the completion of dropping, the resultant mixture was subjected to reaction at 80° C. for 6 hours to obtain a solution of a hydrophilic resin specified in the third present invention. The resin solution had a viscosity of 530 dPa·s (25° C.) at a solid content of 35%. Moreover, a hydrophilic resin film formed from the solution had a breaking strength of 24.5 MPa, a breaking elongation of 450%, and a thermal softening temperature of 115° C.

Production Example 3-2

Synthesis of Tertiary Amino Group-Containing Hydrophilic Polyurea Resin as Third Hydrophilic Resin In a reaction vessel similar to the reaction vessel used in Production Example 3-1, 150 parts of polyethylene oxide diamine ("JEFFAMINE ED" (product name) manufactured by Huntsman Corporation; molecular weight 2000), 30 parts of methyliminobispropylamine, and 4 parts of 1,4-diamino butane were dissolved in 200 parts of DMF, and the resultant solution was stirred well at an internal temperature of 20 to 30° C. And a solution obtained by dissolving 83 parts of hydrogenated MDI in 100 parts of DMF was slowly dropped into the resultant solution under stirring to react. After the completion of dropping, the internal temperature was gradually raised, and when the temperature reached 50° C., the resultant mixture was subjected to reaction for further 6 hours, and thereafter 195 parts of DMF was added to the reaction mixture to obtain a solution of a hydrophilic resin specified in the third present invention. The resin solution had a viscosity of 230 dPa·s (25° C.) at a solid content of 35%. Moreover, a hydrophilic resin film formed from the resin solution had a breaking strength of 27.6 MPa, a breaking elongation of 310%, and a thermal softening temperature of 145° C.

Production Example 3-3

Synthesis of Tertiary Amino Group-Containing Hydrophilic Polyurethane-Polyurea Resin as Third Hydrophilic Resin In a reaction vessel similar to the reaction vessel used in Production Example 3-1, 150 parts of polyethylene oxide diamine ("JEFFAMINE ED" (product name) manufactured by Huntsman Corporation; molecular weight 2000), 30 parts of N,N-dimethyl-N',N'-dihydroxyethyl-1,3-diaminopropane, and 6 parts of methylene glycol were dissolved in 140 parts of DMF. And a solution obtained by dissolving 70 parts of hydrogenated MDI in 200 parts of MEK was slowly dropped into the resultant solution while the resultant solution was stirred well at an internal temperature of 20 to 30° C. After the completion of dropping, the resultant mixture was subjected to reaction at 80° C. for 6 hours, and thereafter 135 parts of MEK was added to the reaction mixture to obtain a solution of a hydrophilic resin specified in the third present invention. The resin solution had a viscosity of 280 dPa·s (25° C.) at a solid content of 35%. Moreover, a hydrophilic resin film formed from the resin solution had a breaking strength of 14.7 MPa, a breaking elongation of 450%, and a thermal softening temperature of 107° C.

Production Example 4-1

Synthesis of Hydrophilic Polyurethane Resin Having Tertiary Amino Group and Polysiloxane Segment as Fourth Hydrophilic Resin A reaction vessel equipped with a stirrer, a thermometer, a gas introducing tube, and a reflux cooler was purged with nitrogen, and in the reaction vessel, 8 parts of a polydimethylsiloxanepolyol having the following structure (molecular weight 3200), 142 parts of polyethylene glycol (molecular weight 2040), 20 parts of N-methyldiethanolamine, and 5 parts of diethylene glycol were dissolved in a mixed solvent of 100 parts of MEK and 200 parts of DMF. And a solution obtained by dissolving 73 parts of hydrogenated MDI in 100 parts of MEK was slowly dropped into the resultant solution while the resultant solution was stirred well at 60° C. After the completion of dropping, the resultant mixture was subjected to reaction at 80° C. for 6 hours, and thereafter 60 parts of MEK was added to the reaction mixture to obtain a solution of a hydrophilic polyurethane resin having a structure specified in the fourth present invention.

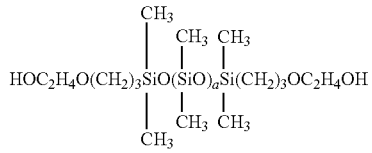

(a is an integer that gives a molecular weight of 3200)

The obtained resin solution had a viscosity of 330 dPa·s (25° C.) at a solid content of 35%. Moreover, a hydrophilic resin film formed from the solution had a breaking strength of 20.5 MPa, a breaking elongation of 400%, and a thermal softening temperature of 103° C.

Production Example 4-2

Synthesis of Hydrophilic Polyurea Resin Having Tertiary Amino Group and Polysiloxane Segment as Fourth Hydrophilic Resin In a reaction vessel similar to the reaction vessel used in Production Example 4-1, 5 parts of a polydimethylsiloxanediamine having the following structure (molecular weight 3880), 145 parts of polyethylene oxide diamine ("JEFFAMINE ED" (product name) manufactured by Huntsman Corporation; molecular weight 2000), 25 parts of methyliminobispropylamine, and 5 parts of 1,4-diaminobutane were dissolved in 250 parts of DMF and the resultant solution was stirred well at an internal temperature of 20 to 30° C. And a solution obtained by dissolving 75 parts of hydrogenated MDI in 100 parts of DMF was slowly dropped into the resultant solution under stirring to react. After the completion of dropping, the internal temperature was gradually raised, and when the temperature reached 50° C., the resultant mixture was subjected to reaction for further 6 hours, and thereafter 124 parts of DMF was added to the reaction mixture to obtain a solution of a hydrophilic polyurea resin having a structure specified in the fourth present invention.

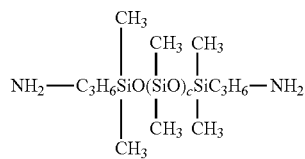

(c is an integer that gives a molecular weight of 3880)

The obtained resin solution had a viscosity of 315 dPa·s (25° C.) at a solid content of 35%. Moreover, a hydrophilic resin film formed from the resin solution had a breaking strength of 31.3 MPa, a breaking elongation of 370%, and a thermal softening temperature of 147° C.

Production Example 4-3

Synthesis of Hydrophilic Polyurethane-Polyurea Resin Having Tertiary Amino Group and Polysiloxane Segment as Fourth Hydrophilic Resin In a reaction vessel similar to the reaction vessel used in Production Example 4-1, 5 parts of an ethylene oxide added type polydimethylsiloxane having the following structure (molecular weight 4500), 145 parts of polyethylene oxide diamine ("JEFFAMINE ED" (trade name) manufactured by Huntsman Corporation; molecular weight 2000), 30 parts of N,N-dimethyl-N',N'-dihydroxyethyl-1,3-diaminopropane, and 5 parts of 1,4-diaminobutane were dissolved in a mixed solvent of 150 parts of MEK and 150 parts of DMF, and the resultant solution was stirred well at an internal temperature of 20 to 30° C. And a solution obtained by dissolving 72 parts of hydrogenated MDI in 100 parts of MEK was slowly dropped into the resultant solution under stirring. After the completion of dropping, the resultant mixture was subjected to reaction at 80° C. for 6 hours, and after the completion of the reaction, 75 parts of MEK was added to the reaction mixture to obtain a solution of a hydrophilic polyurethane-polyurea resin having a structure specified in the fourth present invention.

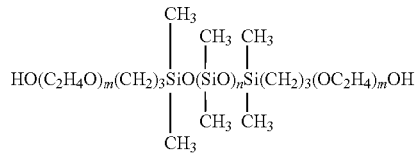

(m and n are integers that gives a molecular weight of 4500)

The obtained resin solution had a viscosity of 390 dPa·s (25° C.) at a solid content of 35%. Moreover, a hydrophilic resin film formed from the resin solution had a breaking strength of 22.7 MPa, a breaking elongation of 450%, and a thermal softening temperature of 127° C.

Production Example 4b

Synthesis of Non-Hydrophilic Polyurethane Resin not Containing Tertiary Amino Group and Polysiloxane Segment to be Used in Comparative Example of Third Present Invention and Fourth Present Invention A reaction vessel similar to the reaction vessel used in Production Example 3-1 was purged with nitrogen, and in the reaction vessel, 150 parts of polybutyleneadipate having an average molecular weight of about 2000 and 15 parts of 1,4-butanediol were dissolved in 250 parts of DMF. And a solution obtained by dissolving 62 parts of hydrogenated MDI in 171 parts of DMF was slowly dropped into the resultant solution while the resultant solution was stirred well at 60° C. After the completion of dropping, the resultant mixture was subjected to reaction at 80° C. for 6 hours to obtain a resin solution to be used in Comparative Example. The resin solution had a viscosity of 320 dPa·s (25° C.) at a solid content of 35%. A non-hydrophilic resin film obtained from the resin solution had a breaking strength of 45 MPa, a breaking elongation of 480%, and a thermal softening temperature of 110° C.

Production Example 5b

Synthesis of Tertiary Amino Group-Containing Non-Hydrophilic Polyurethane Resin to be Used in Comparative Example of Third Present Invention and Fourth Present Invention A reaction vessel similar to the reaction vessel used in Production Example 3-1 was purged with nitrogen, and in the reaction vessel, 150 parts of polybutyleneadipate having an average molecular weight of about 2000, 20 parts of N-methyldiethanolamine, and 5 parts of diethylene glycol were dissolved in a mixed solvent of 200 parts of MEK and 150 parts of DMF. And a solution obtained by dissolving 74 parts of hydrogenated MDI in 112 parts of MEK was slowly dropped into the resultant solution while the resultant solution was stirred well at 60° C. After the completion of dropping, the resultant mixture was subjected to reaction at 80° C. for 6 hours to obtain a resin solution to be used in Comparative Example. The resin solution had a viscosity of 510 dPa·s (25° C.) at a solid content of 35%. Moreover, a non-hydrophilic resin film formed from the resin solution had a breaking strength of 23.5 MPa, a breaking elongation of 470%, and a thermal softening temperature of 110° C.

In Table 7-1, the properties with regard to the respective resins to be used in Examples of the third present invention obtained by the above-described Production Examples 3-1 to 3-3 and respective resins to be used in Comparative Examples of the third present invention obtained by Production Examples 4b and 5b are shown together. Specifically as the properties, the evaluation of hydrophilicity, the weight average molecular weight, and the content of the tertiary amino group (equivalent) per 1000 molecular weight are shown.

TABLE 7-1

Properties of respective resins obtained by respective Production Examples according to the third present invention

| | Hydrophilic/Non-hydrophilic | Weight average molecular weight | Tertiary amino group equivalent (eq/kg) |
|---|---|---|---|
| Production Example 3-1 | Hydrophilic | 87000 | 0.67 |
| Production Example 3-2 | Hydrophilic | 63000 | 0.76 |
| Production Example 3-3 | Hydrophilic | 69000 | 1.23 |
| Production Example 4b | Non-hydrophilic | 72000 | Not contained |
| Production Example 5b | Non-hydrophilic | 84000 | 0.68 |

In Table 7-2, the properties with regard to the respective resins to be used in Examples of the fourth present invention obtained by the above-described Production Examples 4-1 to 4-3 and respective resins to be used in Comparative Examples of the fourth present invention obtained by Production Examples 4b and 5b are shown together. Specifically, the evaluation of hydrophilicity, the weight average molecular weight, and the content of the tertiary amino group (equivalent) per 1000 molecular weight are shown.

TABLE 7-2

Properties of respective resins of respective Production Examples according to the fourth present invention

| | Hydrophilic/Non-hydrophilic | Weight average molecular weight | Tertiary amino group equivalent (eq/kg) | Polysiloxane segment content (%) |
|---|---|---|---|---|
| Production Example 4-1 | Hydrophilic | 75000 | 0.66 | 3.2 |
| Production Example 4-2 | Hydrophilic | 71000 | 0.75 | 2.0 |
| Production Example 4-3 | Hydrophilic | 77000 | 1.22 | 1.2 |
| Production Example 4b | Non-hydrophilic | 72000 | Not contained | Not contained |
| Production Example 5b | Non-hydrophilic | 84000 | 0.68 | Not contained |

Examples 3-1 to 3-3 and Comparative Examples 1B to 2B of Third Present Invention Each of the resin solutions obtained by the above-described Production Examples 3-1 to 3-3, 4b and 5b, and a clay mineral (main component: montmorillonite, product name "Kunipia", manufactured by Kunimine industries Co., Ltd.) were used in respective combinations (represented on a mass basis) shown in Table 8-1 and dispersed for 24 hours by a ball mill using a high density alumina ball (3.5 g/ml). And the contents after the dispersion were taken out through a 200 mesh sieve made of a polyester resin to obtain each liquid resin composition comprising each resin solution and the clay mineral dispersed therein.

TABLE 8-1

Preparation of resin compositions of Examples and Comparative Examples with regard to the third present invention [mass parts]

| | Example 3-1 | Example 3-2 | Example 3-3 | Comparative Example 1B | Comparative Example 2B |
|---|---|---|---|---|---|
| Resin solution of Production Example 3-1 | 100 | | | | |
| Resin solution of Production Example 3-2 | | 100 | | | |
| Resin solution of Production Example 3-3 | | | 100 | | |
| Resin solution of Production Example 4b | | | | 100 | |
| Resin solution of Production Example 5b | | | | | 100 |
| Clay mineral | 10 | 15 | 20 | 10 | 20 |
| Solvent (MEK/DMF = 5/5) | 70 | 85 | 100 | 70 | 100 |

Examples 4-1 to 4-3 and Comparative Examples 1b to 2b of Fourth Present Invention Each of the resin solutions obtained by the above-described Production Examples 4-1 to 4-3, 4b and 5b, and a clay mineral (main component: montmorillonite, product name "Kunipia", manufactured by Kunimine industries Co., Ltd.) were used in respective combinations as shown in Table 8-2 and dispersed for 24 hours by a ball mill using a high density alumina ball (3.5 g/ml). And the contents after the dispersion were taken out through a 200 mesh sieve made of a polyester resin to obtain each liquid resin composition comprising each resin solution and the clay mineral dispersed therein.

TABLE 8-2

Preparation of resin compositions of Examples and Comparative Examples with regard to the fourth present invention [mass parts]

| | Example 4-1 | Example 4-2 | Example 4-3 | Comparative Example 1b | Comparative Example 2b |
|---|---|---|---|---|---|
| Resin solution of Production Example 4-1 | 100 | | | | |
| Resin solution of Production Example 4-2 | | 100 | | | |
| Resin solution of Production Example 4-3 | | | 100 | | |
| Resin solution of Production Example 4b | | | | 100 | |

TABLE 8-2-continued

Preparation of resin compositions of Examples and Comparative Examples with regard to the fourth present invention [mass parts]

|  | Example 4-1 | Example 4-2 | Example 4-3 | Comparative Example 1b | Comparative Example 2b |
|---|---|---|---|---|---|
| Resin solution of Production Example 5b |  |  |  |  | 100 |
| Clay mineral | 15 | 20 | 25 | 15 | 25 |
| Solvent (MEK/DMF = 5/5) | 70 | 85 | 100 | 70 | 100 |

[Evaluation of Third Present Invention and Fourth Present Invention]

The following tests were carried out using each resin composition of Examples and Comparative Examples of the fourth present invention to check the usefulness of each of the obtained resin compositions provided by the fourth present invention. Each resin composition having the formulation shown in Table 8-2 was applied on release paper and dried by heating at 110° C. for 3 minutes to volatilize the solvent, thereby forming each resin film having a thickness of about 20 μm. The following items were evaluated using each resin film thus obtained and formed from each resin composition of Examples 4-1 to 4-3 and Comparative Examples 1b and 2b of the fourth present invention.

<Blocking Resistance (Sticking Resistance)>

Film faces of each resin film of Examples 4-1 to 4-3 and Comparative Examples 1b and 2b formed from each resin composition were placed face to face, thereafter the films were left at 40° C. for 1 day while a load of 0.29 MPa was applied thereon. After that, the blocking property of the films with the faces placed face to face was visually observed and evaluated according to the following criteria. And the obtained results are shown in Table 9 together.

Good: No blocking property was observed.
Fair: The blocking property was slightly observed.
Poor: The blocking property was observed.

<Water Resistance>

Each resin film formed from each resin composition of Examples 4-1 to 4-3 and Comparative Examples 1b and 2b was cut in a shape having a thickness of 20 μm and a longitudinal length of 5 cm×a transversal length of 1 cm and immersed in water having a temperature of 25° C. for 12 hours, and the coefficient of expansion (%) in the longitudinal direction of the immersed film was measured and calculated by measuring the longitudinal length of the film after the immersion test and using the following equation. And the water resistance was evaluated by rating a film having a coefficient of expansion of 200% or less as "Good" and a film having a coefficient of expansion of more than 200% as "Poor". The obtained results are shown in Table 9.

Coefficient of expansion (%)=(Longitudinal length after test/original longitudinal length)×100

TABLE 9

Evaluation results (blocking resistance and water resistance)

|  | Blocking resistance | Water resistance (Coefficient of expansion (%)) |
|---|---|---|
| Example 4-1 | Good | Good (161) |
| Example 4-2 | Good | Good (176) |
| Example 4-3 | Good | Good (190) |
| Comparative Example 1b | Poor | Good (107) |
| Comparative Example 2b | Poor | Good (105) |

<Effect on Removal of Iodine Ion and Cesium Ion>

An iodine ion and cesium ion-removing function of each of the obtained resin compositions provided by the third present invention and the fourth present invention was checked in the following manner. Using each resin composition of Examples and Comparative Examples of the third present invention and the fourth present invention, each resin composition was applied on release paper and dried by heating at 110° C. for 3 minutes to volatilize the solvent, thereby forming each resin film having a thickness of about 20 μm. The effect on the removal of iodine ion and cesium ion was evaluated by the following method using each resin film of Examples and Comparative Examples of the third present invention and the fourth present invention thus obtained.

(Preparation of Iodine Solution and Cesium Solution for Evaluation Tests)

An iodine solution for the evaluation tests was prepared by dissolving potassium iodide in ion exchanged pure water so that the solution had an iodine ion concentration of 200 mg/L (200 ppm). Moreover, a cesium solution for the evaluation tests was prepared by dissolving cesium chloride in ion exchanged pure water so that the solution had a cesium ion concentration of 200 mg/L (200 ppm). In addition, when iodine ion and cesium ion can be removed, radioactive iodine and radioactive cesium can be removed naturally.

(Evaluation Results with Regard to Resin Composition of Example 3-1 of Third Present Invention)

Figure 4:
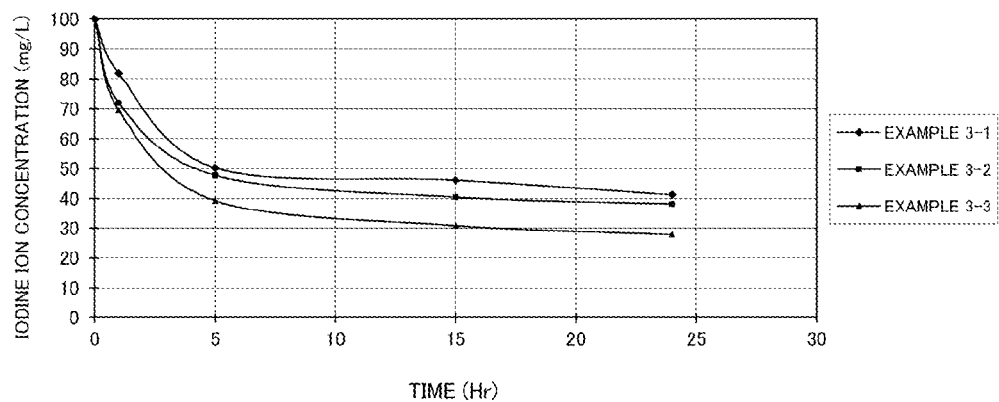
FIG. 4 is a graph showing the relation between the iodine concentration of each aqueous solution and the immersion time of each film prepared by a hydrophilic resin composition of Examples 3-1 to 3-3 according to the third present invention.
Figure 5:
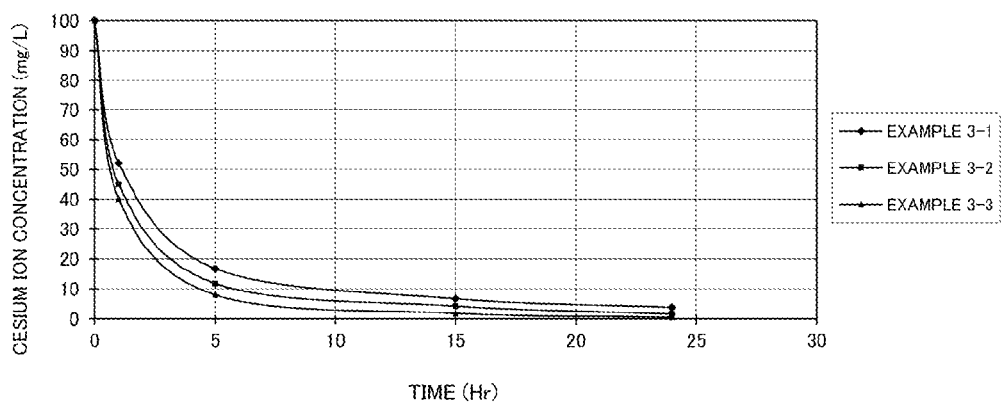
FIG. 5 is a graph showing the relation between the cesium concentration of each aqueous solution and the immersion time of each film prepared by a hydrophilic resin composition of Examples 3-1 to 3-3 according to the third present invention.

In a mixed solution of 50 ml of the iodine solution prepared previously for evaluation tests and 50 ml of the cesium solution also prepared previously for evaluation tests, 20 g of the resin film prepared using the hydrophilic resin composition of Example 3-1 was immersed (25° C.), and the iodine ion concentration and the cesium ion concentration in the solution were measured by an ion chromatograph (IC2001 manufactured by Tosoh Corporation) every time a predetermined time was elapsed. The measurement results are shown in Table 10, and it was confirmed that, as shown in Table 10, both of the iodine ion concentration and the cesium ion concentration in the solution were decreased every time a predetermined time was elapsed. The removing rates of the iodine ion and the cesium ion in the solution measured every time a predetermined time was elapsed are shown in Table 10 together with the iodine ion concentration and the cesium ion concentration. Moreover, the results are shown in FIG. 4 and FIG. 5.

TABLE 10

Evaluation results in the case where the film
made of the resin composition of Example 3-1
of the third present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 81.8 | 18.2 | 52.1 | 47.9 |
| 5 | 50.3 | 49.7 | 16.8 | 83.2 |
| 15 | 46.2 | 53.8 | 6.7 | 93.3 |
| 24 | 41.3 | 58.7 | 3.8 | 96.2 |

(Evaluation Results with Regard to Resin Composition of Example 3-2 of Third Present Invention)

The iodine ion concentration and the cesium ion concentration in the solution were measured every time a predetermined time was elapsed in the same manner as in the case where the resin film prepared using the hydrophilic resin composition of Example 3-1 was used except that 20 g of the resin film prepared by the hydrophilic resin composition of Example 3-2 was used. The obtained results are shown in Table 11, FIG. 4, and FIG. 5 in the same manner as in the case of Example 3-1 described previously.

TABLE 11

Evaluation results in the case where the film
made of the resin composition of Example 3-2
of the third present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 72.0 | 28.0 | 45.0 | 55.0 |
| 5 | 47.8 | 52.2 | 11.8 | 88.2 |
| 15 | 40.5 | 59.5 | 4.2 | 95.8 |
| 24 | 38.2 | 61.8 | 1.6 | 98.4 |

(Evaluation Results with Regard to Resin Composition of Example 3-3 of Third Present Invention)

The iodine ion concentration and the cesium ion concentration in the solution were measured every time a predetermined time was elapsed in the same manner as in the case where the resin film prepared using the hydrophilic resin composition of Example 3-1 was used except that 20 g of the resin film prepared by the hydrophilic resin composition of Example 3-3 was used. The obtained results are shown in Table 12, FIG. 4, and FIG. 5 in the same manner as in the case of Example 3-1 described previously.

TABLE 12

Evaluation results in the case where the film
made of the resin composition of Example 3-3
of the third present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 69.5 | 30.5 | 40.1 | 59.9 |

TABLE 12-continued

Evaluation results in the case where the film
made of the resin composition of Example 3-3
of the third present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 5 | 39.3 | 60.7 | 8.0 | 92.0 |
| 15 | 30.8 | 69.2 | 1.8 | 98.2 |
| 24 | 27.8 | 72.2 | 0.5 | 99.5 |

(Evaluation Results with Regard to Resin Composition of Comparative Example 1B of Third Present Invention)

Figure 8:
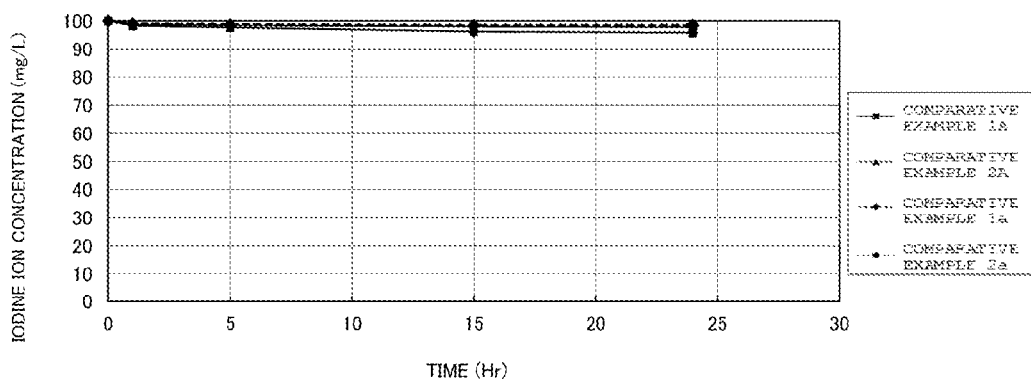
FIG. 8 is a graph showing the relation between the iodine concentration of each aqueous solution and the immersion time of each film prepared by a non-hydrophilic resin composition of Comparative Examples 1B and 2B to the third present invention and Comparative Examples 1b and 2b to the fourth present invention.
Figure 9:
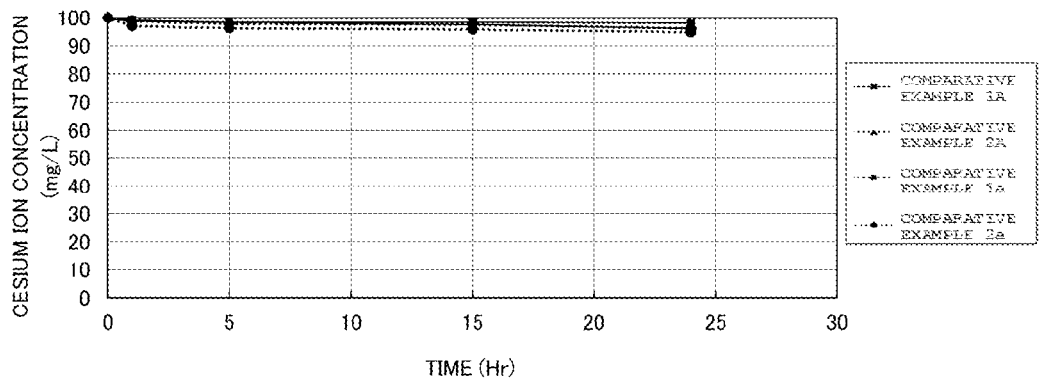
FIG. 9 is a graph showing the relation between the cesium concentration of each aqueous solution and the immersion time of each film prepared by a non-hydrophilic resin composition of Comparative Examples 1B and 2B to the third present invention and Comparative Examples 1b and 2b to the fourth present invention.

The iodine ion concentration and the cesium ion concentration in the solution were measured every time a predetermined time was elapsed in the same manner as in the case where the resin film prepared using the hydrophilic resin composition of Example 3-1 except that 20 g of the resin film prepared by the non-hydrophilic resin composition of Comparative Example 1B was used. The obtained results are shown in Table 13, FIG. 8, and FIG. 9 in the same manner as in the case of Example 3-1 described previously. As clearly understood from these results, the superiority of the performance of removing the iodine and cesium ions in Examples of the third present invention was confirmed.

TABLE 13

Evaluation results in the case where the film made of the
resin composition of Comparative Example 1B was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 98.8 | 1.2 | 99.3 | 0.7 |
| 5 | 98.4 | 1.6 | 98.5 | 1.5 |
| 15 | 98.1 | 1.9 | 98.3 | 1.7 |
| 24 | 97.8 | 2.2 | 98.1 | 1.9 |

(Evaluation Results with Regard to Resin Composition of Comparative Example 2B of Third Present Invention)

The iodine ion concentration and the cesium ion concentration in the solution were measured every time a predetermined time was elapsed in the same manner as in the case where the resin film prepared using the hydrophilic resin composition of Example 3-1 except that 20 g of the resin film prepared by the non-hydrophilic resin composition of Comparative Example 2B was used. The obtained results are shown in Table 14, FIG. 8, and FIG. 9 in the same manner as in the case of Example 3-1 described previously. As a result thereof, although the removing rates of the iodine ion and the cesium ion were improved more in the case where the non-hydrophilic resin composition of Comparative Example 2B was used than in the case where the non-hydrophilic resin composition of Comparative Example 1B was used, the superiority of the performance of removing the iodine and cesium ions in Examples of the third present invention was confirmed.

TABLE 14

Evaluation results in the case where the film made of the resin composition of Comparative Example 2B was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 98.3 | 1.7 | 98.8 | 1.2 |
| 5 | 97.7 | 2.3 | 98.3 | 1.7 |
| 15 | 96.3 | 3.7 | 97.5 | 2.5 |
| 24 | 95.8 | 4.2 | 96.1 | 3.9 |

(Evaluation Results with Regard to Resin Composition of Example 4-1 of Fourth Present Invention)

Figure 6:
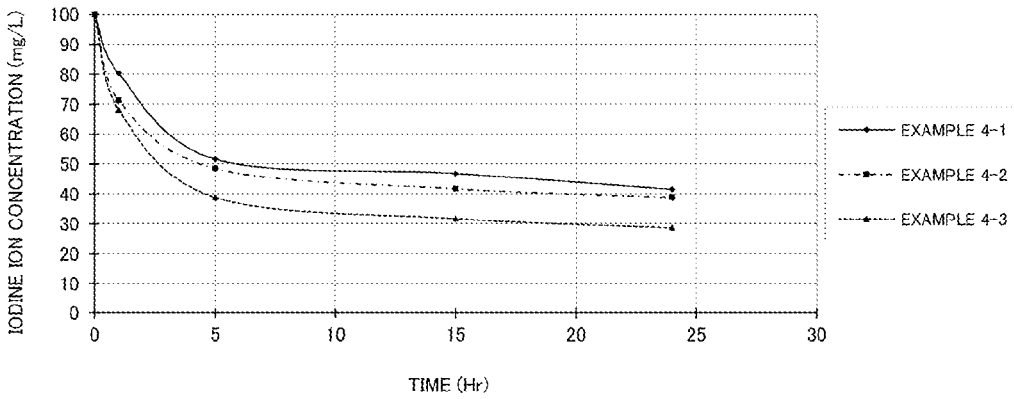
FIG. 6 is a graph showing the relation between the iodine concentration of each aqueous solution and the immersion time of each film prepared by a hydrophilic resin composition of Examples 4-1 to 4-3 according to the fourth present invention.
Figure 7:
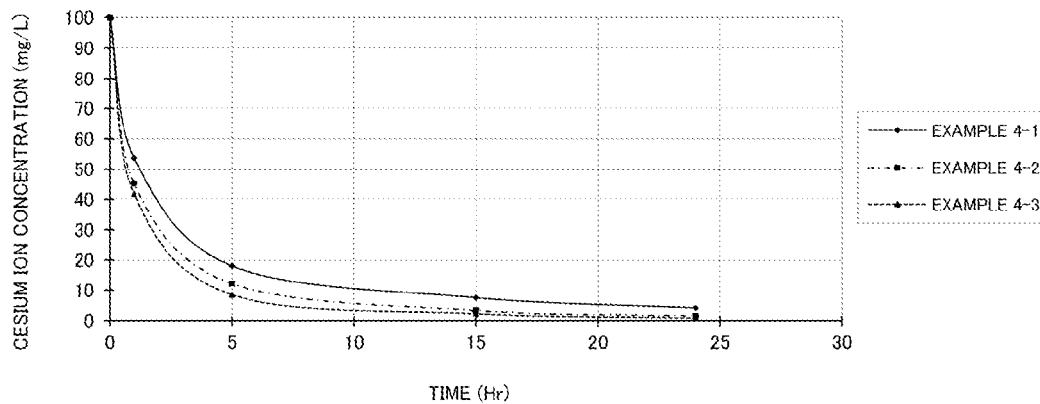
FIG. 7 is a graph showing the relation between the cesium concentration of each aqueous solution and the immersion time of each film prepared by a hydrophilic resin composition of Examples 4-1 to 4-3 according to the fourth present invention.

In a mixed solution of 50 ml of the iodine solution prepared previously for evaluation tests and 50 ml of the cesium solution also prepared previously for evaluation tests (the ion concentration of both solutions was 200 ppm), 20 g of the resin film prepared using the hydrophilic resin composition of Example 4-1 was immersed and left standing (25° C.), and the iodine ion concentration and the cesium ion concentration in the solution were measured by an ion chromatograph (IC2001 manufactured by Tosoh Corporation) every time a predetermined time was elapsed. The results are shown in Table 15, and it was confirmed that, as shown in Table 15, both of the iodine ion concentration and the cesium ion concentration in the solution were decreased every time a predetermined time was elapsed. The removing rates of the iodine ion and the cesium ion in the solution every time a predetermined time is elapsed are listed in Table 15 together with the iodine ion concentration and the cesium ion concentration. Moreover, the results are shown in FIG. 6 and FIG. 7.

TABLE 15

Evaluation results in the case where the film made of the resin composition of Example 4-1 of the fourth present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 82.1 | 17.9 | 50.8 | 49.2 |
| 5 | 55.6 | 44.4 | 19.2 | 80.8 |
| 15 | 50.2 | 49.8 | 11.5 | 88.5 |
| 24 | 47.8 | 52.2 | 7.1 | 92.9 |

(Evaluation Results with Regard to Resin Composition of Example 4-2 of Fourth Present Invention)

The iodine ion concentration and the cesium ion concentration in the solution were measured every time a predetermined time was elapsed in the same manner as in the case where the resin film prepared using the hydrophilic resin composition of Example 4-1 was used except that 20 g of the resin film prepared using the hydrophilic resin composition of Example 4-2 was used. The obtained results are shown in Table 16, FIG. 6, and FIG. 7 in the same manner as in the case of Example 4-1 described previously. As a result thereof, it was confirmed that both of the iodine ion concentration and the cesium ion concentration in the solution were decreased every time a predetermined time was elapsed also in the case where the hydrophilic resin composition of Example 4-2 was used.

TABLE 16

Evaluation results in the case where the film made of the resin composition of Example 4-2 of the fourth present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 80.8 | 19.2 | 44.1 | 55.9 |
| 5 | 53.5 | 46.5 | 13.5 | 86.5 |
| 15 | 45.3 | 54.7 | 6.2 | 93.8 |
| 24 | 43.1 | 56.9 | 4.0 | 96.0 |

(Evaluation Results with Regard to Resin Composition of Example 4-3 of Fourth Present Invention)

The iodine ion concentration and the cesium ion concentration in the solution were measured every time a predetermined time was elapsed in the same manner as in the case where the resin film prepared using the hydrophilic resin composition of Example 4-1 was used except that 20 g of the resin film prepared using the hydrophilic resin composition of Example 4-3 was used. The obtained results are shown in Table 17, FIG. 6, and FIG. 7 in the same manner as in the case of Example 4-1 described previously. As a result thereof, it was confirmed that both of the iodine ion concentration and the cesium ion concentration in the solution were decreased every time a predetermined time was elapsed also in the case where the hydrophilic resin composition of Example 4-3 was used.

TABLE 17

Evaluation results in the case where the film made of the resin composition of Example 4-3 of the fourth present invention was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 78.7 | 21.3 | 40.8 | 59.2 |
| 5 | 48.2 | 51.8 | 11.2 | 88.8 |
| 15 | 41.5 | 58.5 | 4.5 | 95.5 |
| 24 | 38.0 | 62.0 | 1.5 | 98.5 |

(Evaluation Results with Regard to Resin Composition of Comparative Example 1b of Fourth Present Invention)

The iodine ion concentration and the cesium ion concentration in the solution were measured every time a predetermined time was elapsed in the same manner as in the case where the resin film prepared using the hydrophilic resin composition of Example 4-1 except that 20 g of the resin film prepared by the non-hydrophilic resin composition of Comparative Example 1b was used. The obtained results are shown in Table 18, FIG. 8, and FIG. 9 in the same manner as in the case of Example 4-1 described previously. As clearly understood from these results, the superiority of the performance of removing the iodine and cesium ions in Examples of the fourth present invention was confirmed.

TABLE 18

Evaluation results in the case where the film made of the resin composition of Comparative Example 1b was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 99.0 | 1.0 | 98.7 | 1.3 |
| 5 | 98.8 | 1.2 | 97.8 | 2.2 |
| 15 | 98.5 | 1.5 | 97.5 | 2.5 |
| 24 | 98.5 | 1.5 | 96.2 | 3.8 |

(Evaluation Results with Regard to Resin Composition of Comparative Example 2b of Fourth Present Invention)

The iodine ion concentration and the cesium ion concentration in the solution were measured every time a predetermined time was elapsed in the same manner as in the case where the resin film prepared using the hydrophilic resin composition of Example 4-1 except that 20 g of the resin film prepared by the non-hydrophilic resin composition of Comparative Example 2b was used. The obtained results are shown in Table 19, FIG. 8, and FIG. 9 in the same manner as in the case of Example 4-1 described previously. As a result thereof, although the removing rates of the iodine ion and the cesium ion were improved more in the case where the non-hydrophilic resin composition of Comparative Example 2b was used than in the case where the non-hydrophilic resin composition of Comparative Example 1b was used, the superiority of the performance of removing the iodine and cesium ions in Examples of the fourth present invention was confirmed.

TABLE 19

Evaluation results in the case where the film made of the resin composition of Comparative Example 2b was used

| Immersion time (Hr) | Iodine ion | | Cesium ion | |
|---|---|---|---|---|
| | Concentration in solution (ppm) | Removing rate (%) | Concentration in solution (ppm) | Removing rate (%) |
| 0 | 100.0 | — | 100.0 | — |
| 1 | 98.5 | 1.5 | 97.0 | 3.0 |
| 5 | 97.8 | 2.2 | 96.2 | 3.8 |
| 15 | 96.2 | 3.8 | 95.8 | 4.2 |
| 24 | 96.0 | 4.0 | 94.8 | 5.2 |

INDUSTRIAL APPLICABILITY

As an application example of the first present invention and the second present invention, radioactive cesium in liquid and/or a solid matter can be processed simply and at low cost, furthermore the processing of removing radioactive cesium can be performed without the need for an energy source such as electricity, therefore it becomes possible to remove simply and economically a radioactive substance which is present in liquid or a solid matter and which has recently been a problem by carrying out the novel method for removing radioactive cesium, and thus the utilization is expected.

Particularly, by the technology of the first present invention, the removed radioactive cesium is quickly taken in the first hydrophilic resin composition comprising: a first hydrophilic resin having a hydrophilic segment; and a clay mineral and can stably be immobilized, furthermore since the main component of the first hydrophilic resin composition is a resin composition, the volume reduction of radioactive waste can be achieved as necessary, therefore the problem that radioactive waste produced after the processing of removing radioactive substances becomes huge can be reduced, the practical value is extremely high, and the utilization is expected.

Moreover, with the second present invention, in addition to the effect obtained by the above-described first present invention, the realization of the water resistance and the blocking resistance (sticking resistance) of the surface to the resin film or the like formed from the second hydrophilic resin is brought about by introducing a polysiloxane segment in the structure of the second hydrophilic resin to be used having a hydrophilic segment, therefore the practicability of the removal processing can be enhanced, and thus the utilization is expected also from the point of realizing the water resistance and the blocking resistance. Furthermore, by the second present invention, the removed radioactive cesium can be taken in the hydrophilic resin composition comprising: a second hydrophilic resin having a particular structure; and a clay mineral and can stably be immobilized, and besides, since the second present invention provides a resin composition, the volume reduction of the radioactive waste is made possible, and therefore the problem in the radioactive waste which arises after the removal processing is reduced, and thus the utilization is expected.

As an application example of the third present invention and the fourth present invention, radioactive iodine and radioactive cesium in a radioactive waste liquid and/or a radioactive solid matter can be removed simply and at low cost, furthermore without the need for an energy source such as electricity, therefore it becomes possible to remove simply and economically radioactive substances which are present in a mixed state in liquid or a solid matter and which have been a problem recently by carrying out the novel method for simultaneously removing radioactive iodine and radioactive cesium, and thus the practical value is extremely high.

Particularly, by the technology of the third present invention, the removed radioactive iodine and radioactive cesium are taken in the third hydrophilic resin composition comprising: a third hydrophilic resin having a particular structure; and a clay mineral and can stably be immobilized, furthermore since the main component of the third hydrophilic resin composition is a resin composition, the volume reduction of radioactive waste can be achieved as necessary, therefore the problem in large amounts of radioactive waste produced after the processing of removing radioactive substances can be reduced, and the utilization is expected.

Moreover, by the fourth present invention, it becomes possible to realize, in addition to the effect obtained by the above-described third present invention, the water resistance and the blocking resistance (sticking resistance) of the resin surface brought about by the presence of a polysiloxane segment and to enhance the practicability in the case where the removal processing is performed using a film or the like by using the fourth hydrophilic resin composition comprising a fourth hydrophilic resin in which, in addition to a hydrophilic segment and a tertiary amino group that forms an ion bond with radioactive iodine, a polysiloxane segment is further introduced in the structure thereof, therefore the problem in radioactive waste produced after the processing of removing radioactive substances can be reduced, and the utilization can be expected.

The invention claimed is:

1. A method for removing radioactive cesium applying removal processing to radioactive cesium in a radioactive waste liquid and/or a radioactive solid matter using a hydrophilic resin composition comprising a hydrophilic resin and a clay mineral,
wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment; and
the hydrophilic resin composition comprises the clay mineral dispersed therein in a ratio of at least 1 to 180 mass parts relative to 100 mass parts of the hydrophilic resin.

2. A method for removing radioactive cesium applying removal processing to radioactive cesium present in a radioactive waste liquid and/or a radioactive solid matter using a hydrophilic resin composition comprising a hydrophilic resin and a clay mineral,
wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a polysiloxane segment; and
the hydrophilic resin composition comprises the clay mineral dispersed therein in a ratio of at least 1 to 180 mass parts relative to 100 mass parts of the hydrophilic resin.

3. The method for removing radioactive cesium according to claim 2, wherein the hydrophilic resin is a resin formed from, as a part of a raw material, a compound having at least one active hydrogen-containing group and a polysiloxane segment in the same molecule.

4. The method for removing radioactive cesium according to claim 1, wherein the hydrophilic segment is a polyethylene oxide segment.

5. The method for removing radioactive cesium according to claim 1, wherein the clay mineral is at least one selected from the group consisting of pyrophylite, Kaolinite, mica, smectite (montmorillonite), and vermiculite each having a layered structure.

6. A hydrophilic resin composition for removing radioactive cesium having a function capable of immobilizing radioactive cesium in liquid and/or a solid matter,
wherein the hydrophilic resin composition comprises a hydrophilic resin and a clay mineral;
the hydrophilic resin is a hydrophilic resin having a hydrophilic segment, the resin being insoluble to water and hot water; and
the clay mineral is dispersed in the hydrophilic resin composition in a ratio of at least 1 to 180 mass parts relative to 100 mass parts of the hydrophilic resin.

7. A hydrophilic resin composition for removing radioactive cesium having a function of removing radioactive cesium in liquid and/or a solid matter,
wherein the hydrophilic resin composition comprises a hydrophilic resin and a clay mineral;
the hydrophilic resin is at least one selected from the group consisting of a hydrophilic polyurethane resin, a hydrophilic polyurea resin, and a hydrophilic polyurethane-polyurea resin each having a hydrophilic segment and each obtained by reacting an organic polyisocyanate with a high molecular weight hydrophilic polyol and/or polyamine being a hydrophilic component; and
the clay mineral is dispersed in the hydrophilic resin composition in a ratio of at least 1 to 180 mass parts relative to 100 mass parts of the hydrophilic resin.

8. A hydrophilic resin composition for removing radioactive cesium exhibiting a function capable of immobilizing radioactive cesium in liquid and/or a solid matter,
wherein the hydrophilic resin composition comprises a hydrophilic resin and a clay mineral;
the hydrophilic resin is a resin having a hydrophilic segment and a polysiloxane segment and obtained by reacting, as a part of a raw material, a compound having at least one active hydrogen-containing group and a polysiloxane segment in the same molecule, the resin being insoluble to water and hot water; and
the clay mineral is dispersed in the hydrophilic resin composition in a ratio of at least 1 to 180 mass parts relative to 100 mass parts of the hydrophilic resin.

9. A hydrophilic resin composition for removing radioactive cesium exhibiting a function capable of immobilizing radioactive cesium in liquid and/or a solid matter,
wherein the hydrophilic resin composition comprises a hydrophilic resin and a clay mineral;
the hydrophilic resin is at least one selected from the group consisting of a hydrophilic polyurethane resin, a hydrophilic polyurea resin, and a hydrophilic polyurethane-polyurea resin each having a hydrophilic segment, further each having, in the main chain and/or a side chain in the structure thereof, a polysiloxane segment, and each obtained by reacting an organic polyisocyanate, a high molecular weight hydrophilic polyol and/or polyamine being a hydrophilic component, and a compound having at least one active hydrogen-containing group and a polysiloxane segment in the same molecule; and
the clay mineral is dispersed in the hydrophilic resin composition in a ratio of at least 1 to 180 mass parts relative to 100 mass parts of the hydrophilic resin.

10. The hydrophilic resin composition for removing radioactive cesium according to claim 6, wherein the hydrophilic segment is a polyethylene oxide segment.

11. The hydrophilic resin composition for removing radioactive cesium according to claim 6, wherein the clay mineral is at least one selected from the group consisting of pyrophylite, Kaolinite, mica, smectite (montmorillonite), and vermiculite each having a layered structure.

12. A method for removing radioactive iodine and radioactive cesium applying removal processing to both of radioactive iodine and radioactive cesium in a radioactive waste liquid and/or a radioactive solid matter using a hydrophilic resin composition comprising a hydrophilic resin and a clay mineral,
wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a tertiary amino group; and
the hydrophilic resin composition comprises the clay mineral dispersed therein in a ratio of 1 to 180 mass parts relative to 100 mass parts of the hydrophilic resin.

13. The method for removing radioactive iodine and radioactive cesium according to claim 12, wherein the hydrophilic resin is a resin formed from, as a part of a raw material, a polyol having at least one tertiary amino group or a polyamine having at least one tertiary amino group.

14. A method for removing radioactive iodine and radioactive cesium capable of applying removal processing to both of radioactive iodine and radioactive cesium present in a radioactive waste liquid and/or a radioactive solid matter using a hydrophilic resin composition comprising a hydrophilic resin and a clay mineral, wherein the hydrophilic resin composition comprises at least one hydrophilic resin selected from the group consisting of a hydrophilic polyurethane resin, a hydrophilic polyurea resin, and a hydrophilic polyurethane-polyurea resin each having a hydrophilic segment and further each having, in the main chain and/or a side chain in the structure thereof, a tertiary amino group and a polysiloxane segment; and the hydrophilic resin composition comprises the clay mineral dispersed therein in a ratio of 1 to 180 mass parts relative to 100 mass parts of the hydrophilic resin.

15. The method for removing radioactive iodine and radioactive cesium according to claim 14, wherein the hydrophilic resin is a resin formed from, as a part of a raw material, a polyol having at least one tertiary amino group or a polyamine having at least one tertiary amino group, and a compound having at least one active hydrogen-containing group and a polysiloxane segment in the same molecule.

16. The method for removing radioactive iodine and radioactive cesium according to claim 12, wherein the hydrophilic segment is a polyethylene oxide segment.

17. The method for removing radioactive iodine and radioactive cesium according to claim 12, wherein the clay mineral is at least one selected from the group consisting of pyrophylite, Kaolinite, mica, smectite (montmorillonite), and vermiculite each having a layered structure.

18. A hydrophilic resin composition for removing radioactive iodine and radioactive cesium exhibiting a function capable of immobilizing both of radioactive iodine and radioactive cesium present in liquid and/or a solid matter, wherein the hydrophilic resin composition comprises a hydrophilic resin and a clay mineral;

the hydrophilic resin is a resin having a hydrophilic segment, having, in the molecular chain thereof, a tertiary amino group, and formed from, as a part of a raw material, a polyol having at least one tertiary amino group or a polyamine having at least one tertiary amino group, the resin being insoluble to water and hot water; and the clay mineral is dispersed in the hydrophilic resin composition in a ratio of 1 to 180 mass parts relative to 100 mass parts of the hydrophilic resin.

19. A hydrophilic resin composition for removing radioactive iodine and radioactive cesium exhibiting a function capable of immobilizing both of radioactive iodine and radioactive cesium present in liquid and/or a solid matter, wherein the hydrophilic resin composition comprises a hydrophilic resin and a clay mineral;

the hydrophilic resin is at least one selected from the group consisting of a hydrophilic polyurethane resin, a hydrophilic polyurea resin, and a hydrophilic polyurethane-polyurea resin each having a hydrophilic segment, and each obtained by reacting an organic polyisocyanate, a high molecular weight hydrophilic polyol and/or polyamine being a hydrophilic component, and a compound having at least one active hydrogen-containing group and at least one tertiary amino group in the same molecule; and the clay mineral is dispersed in the hydrophilic resin composition in a ratio of at least 1 to 180 mass parts relative to 100 mass parts of the hydrophilic resin.

20. A hydrophilic resin composition for removing radioactive iodine and radioactive cesium, having a function capable of immobilizing both of radioactive iodine and radioactive cesium in liquid and/or a solid matter and comprising a hydrophilic resin and a clay mineral, wherein the hydrophilic resin is a resin having a hydrophilic segment, having, in the molecular chain thereof, a tertiary amino group and a polysiloxane segment, and formed from, as a part of a raw material, a polyol having at least one tertiary amino group or a polyamine having at least one tertiary amino group and a compound having at least one active hydrogen-containing group and a polysiloxane segment in the same molecule, the resin being insoluble to water and hot water; and the clay mineral is dispersed in the hydrophilic resin composition in a ratio of at least 1 to 180 mass parts relative to 100 mass parts of the hydrophilic resin.

21. A hydrophilic resin composition for removing radioactive iodine and radioactive cesium, exhibiting a function capable of immobilizing both of radioactive iodine and radioactive cesium in liquid and/or a solid matter and comprising a hydrophilic resin and a clay mineral, wherein the hydrophilic resin is at least one selected from the group consisting of a hydrophilic polyurethane resin, a hydrophilic polyurea resin, and a hydrophilic polyurethane-polyurea resin each having a hydrophilic segment, further each having, in the main chain and/or a side chain in the structure thereof, a tertiary amino group and a polysiloxane segment, and each obtained by reacting an organic polyisocyanate, a high molecular weight hydrophilic polyol and/or polyamine being a hydrophilic component, a compound having at least one active hydrogen-containing group and at least one tertiary amino group in the same molecule, and a compound having at least one active hydrogen-containing group and a polysiloxane segment in the same molecule; and the clay mineral is dispersed in the hydrophilic resin composition in a ratio of at least 1 to 180 mass parts relative to 100 mass parts of the hydrophilic resin.

22. The hydrophilic resin composition for removing radioactive iodine and radioactive cesium according to claim 18, wherein the hydrophilic segment of the hydrophilic resin is a polyethylene oxide segment.

23. The hydrophilic resin composition for removing radioactive iodine and radioactive cesium according to claim 18, wherein the clay mineral is at least one selected from the group consisting of pyrophylite, Kaolinite, mica, smectite (montmorillonite), and vermiculite each having a layered structure.

\* \* \* \* \*